United States Patent
Kwong et al.

(10) Patent No.: US 9,934,411 B2
(45) Date of Patent: Apr. 3, 2018

(54) APPARATUS FOR PHYSICALLY UNCLONABLE FUNCTION (PUF) FOR A MEMORY ARRAY

(71) Applicant: TEXAS INSTRUMENTS INCORPORATED, Dallas, TX (US)

(72) Inventors: Joyce Kwong, Dallas, TX (US); Clive Bittlestone, Allen, TX (US); Manish Goel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 219 days.

(21) Appl. No.: 14/798,067

(22) Filed: Jul. 13, 2015

(65) Prior Publication Data
US 2017/0017808 A1  Jan. 19, 2017

(51) Int. Cl.
| | |
|---|---|
| *G11C 11/00* | (2006.01) |
| *G06F 21/73* | (2013.01) |
| *G11C 11/419* | (2006.01) |
| *G11C 29/50* | (2006.01) |
| *G09C 1/00* | (2006.01) |
| *H04L 9/32* | (2006.01) |
| *G11C 29/44* | (2006.01) |

(52) U.S. Cl.
CPC ............ *G06F 21/73* (2013.01); *G09C 1/00* (2013.01); *G11C 11/419* (2013.01); *G11C 29/50012* (2013.01); *H04L 9/3278* (2013.01); *G11C 2029/4402* (2013.01); *G11C 2029/5002* (2013.01)

(58) Field of Classification Search
CPC ............ G06F 21/73; G11C 2029/4402; G11C 11/419; G11C 2029/5002; G11C 29/50012; G09C 1/00; H04L 9/3278
USPC .................... 365/154, 189.09, 189.07, 233.1
See application file for complete search history.

(56) References Cited

U.S. PATENT DOCUMENTS

| | | | |
|---|---|---|---|
| 7,482,657 B1 | 1/2009 | Lucero | |
| 8,854,866 B2 * | 10/2014 | Huber | G06F 21/72 365/154 |

(Continued)

OTHER PUBLICATIONS

Charlie Miller and Chris Valasek, "A Survey of Remote Automotive Attack Surfaces," http://illmatics.com/remote%20attack%20surfaces.pdf, Oct. 2014, 95 pages.

(Continued)

*Primary Examiner* — David Lam
(74) *Attorney, Agent, or Firm* — Michelle F. Murray; Charles A. Brill; Frank D. Cimino

(57) ABSTRACT

Methods and apparatus for creating a physically unclonable function for SRAM are disclosed. An example method includes after applying a voltage to a memory array: determining a first duration between the applying of the voltage and a first output of a first bit cell, the first output corresponding to a first value stored in the first bit cell, and determining a second duration between the applying of the voltage and a second output of a second bit cell, the second output corresponding to a second value stored in the second bit cell. The example method further includes determining a function based on a comparison of the first duration and the second duration, the function to establish an identification of a circuit that includes the memory array.

17 Claims, 15 Drawing Sheets

(56) References Cited

U.S. PATENT DOCUMENTS

| | | | | |
|---|---|---|---|---|
| 9,489,504 | B2* | 11/2016 | Yang | G06F 21/44 |
| 2014/0201851 | A1* | 7/2014 | Guo | H04L 9/0866 |
| | | | | 726/34 |

OTHER PUBLICATIONS

Techinsights, "Discovering new eFUSE technology in the Intel Westmere 32 nm CPU," https://www.techinsights.com/uploadedFiles/Public_Website/Content_-_Primary/Investigative_Analysis/2011/Five_Top_Trends_in_the_Mobile_Industry_for_2011/eFUSE%20technology%20in%20the%20Intel%20Westmere%20Clarkdale%20CPU.pdf, Nov. 15, 2010, 10 pages.

G. Edward Suh and Srinivas Devadas, "Physical Unclonable Functions for Device Authentication and Secret Key Generation," Jun. 4-8, 2007, 6 pages, DAC 2007, San Diego, California, USA.

Jorge Guajardo, Sandeep S. Kumar, Geert-Jan Schrijen, and Pim Tuyls, "FPGA Intrinsic PUFs and Their Use for IP Protection," Information and Systems Security Group, Phillips Research Laboratories, Eindhoven, The Netherlands, Sep. 2007, 24 pages, P. Paillier and I. Verbauwhede (Eds.): CHES 2007, LNCD 4727, pp. 63-80, Springer-Verlad Berlin Heidelberg, 2007.

Geert-Jan Schrijen and Vincent Van Der Leest, "Comparative analysis of SRAM memories used as PUF primitives," Mar. 2012, Intrinsic-ID, Eidenhoven, The Netherlands, http://www.intrinsic-id.com, 7 pages.

Microsemi, "SmartFusion2 SoC FPGA Security and Reliability User's Guide," Jan. 2015, Microsemi Corporate Headquarters, One Enterprise, Aliso Viejo, CA USA, 99 pages.

NXP, "PUF—Physical Unclonable Functions Protecting next-generation Smart Card ICs with SRAM-based PUFs," Feb. 2013, NXP Semiconductors N.V., Netherlands, 8 pages.

Mudit Bhargava and Ken Mai, "High Reliability PUF using Hot-Carrier Injection Based Response Reinforcement," Aug. 2013, Electrical and Computer Engineering-Carnegie Mellon University, 28 pages.

Roel Maes and Vincent Van Der Leest, "Countering the Effects of Silicon Aging on SRAM PUFs," May 2014, IEEE International Symposium on Hardware-Oriented Security and Trust (HOST), the Netherlands, 7 pages.

Christophe De Nardi, Romain Desplats, Philippe Perdu, Félix Beaudoin, and Jean Luc Gauffier, "EEPROM Failure Analysis Methodology: Can Programmed Charges Be Measured Directly by Electrical Techniques of Scanning Probe Microscopy?", Proceedings of the 31st International Symposium for Testing and Failure Analysis, Nov. 6-10, 2005, McEnery Convention Center, ASM International, San Jose, California, USA, 6 pages.

Aswin Raghav Krishna, Seetharam Narasimhan, Xinmu Wang, and Swarup Bhunia, "MECCA: A Robust Low-Overhead PUF Using Embedded Memory Array," Oct. 2011, Case Western Reserve University, Cleveland, Ohio, 44106, USA, ark70@case.edu, B. Preneel and T. Takagi (Eds.): CHES 2011, LNCS 6917, pp. 407-420, 2011, International Association for Cryptologic Research 2011, 18 pages.

* cited by examiner

US 9,934,411 B2

APPARATUS FOR PHYSICALLY UNCLONABLE FUNCTION (PUF) FOR A MEMORY ARRAY

FIELD OF THE DISCLOSURE

This disclosure relates generally to memory devices and, more particularly, to methods and apparatus to create a Physically Unclonable Function (PUF).

BACKGROUND

A Physically Unclonable Function (PUF) is a function based on electrical and physical characteristics of an integrated circuit that may be used to uniquely identify the integrated circuit. A PUF is determined based on responses (e.g., outputs) of an integrated circuit to challenges (e.g., inputs) provided to the integrated circuit. Integrated circuits have unique responses to challenges based on differences in the electrical and physical characteristics (e.g., variations in doping levels, resistances, capacitances, etc.) of the integrated circuits that result from the manufacturing processes of such circuits. These challenge-response pairs can be used to generate a PUF to uniquely identify a corresponding integrated circuit. Using a PUF as a unique identifier for an integrated circuit can be used to prevent attackers from easily cloning the circuit.

SUMMARY

Examples disclosed herein measure the read access times of bit cells of SRAM to create a PUF. An example method disclosed herein includes determining a first duration between the applying of a voltage and a first output of a first bit cell, the first output corresponding to a first value stored in the first bit cell. In such examples, a timer determines a second duration between the applying of the voltage and a second output of a second bit cell, the second output corresponding to a second value stored in the second bit cell. In such examples, a processor determines a function based on a comparison of the first duration and the second duration, the function to establish an identification of a circuit that includes the memory array.

DETAILED DESCRIPTION

Figure 1:
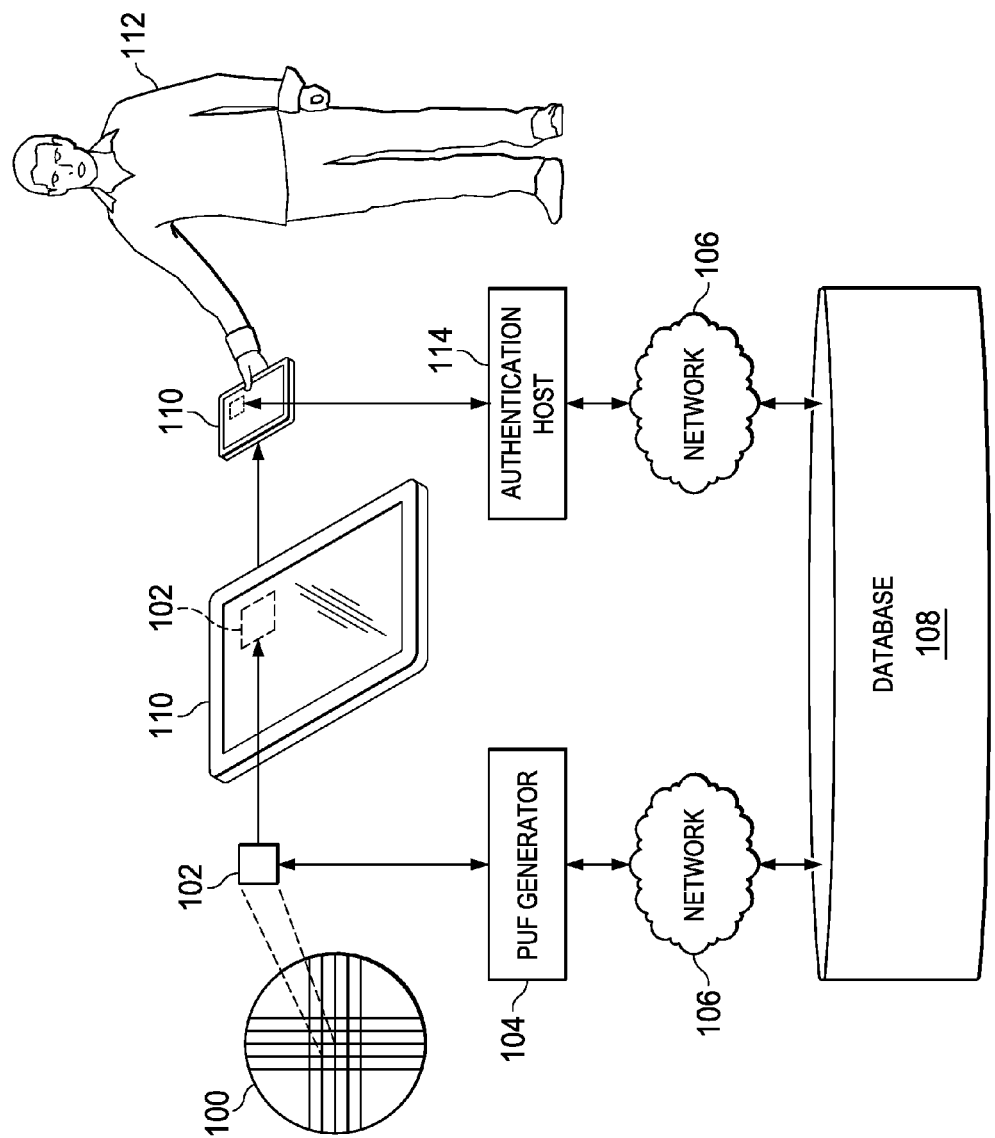
FIG. 1 is an example manner of incorporating an example SRAM in an example product for use in connection with the example PUF techniques disclosed herein.

A Physically Unclonable Function (PUF) is a function based on electrical and physical characteristics of an integrated circuit used to identify the integrated circuit. The PUF is made up of challenges (e.g., inputs) provided to the integrated circuit, and responses (e.g., outputs) to the challenges. There are many different types of PUFs. A PUF can be categorized as either weak or strong. A PUF is considered weak if it produces responses to a relatively small number of challenges. A PUF is considered strong if it produces responses to a relatively large number of challenges. Conventional Static Random Access Memory (SRAM) PUFs are categorized as weak PUFs. Such weakness is in part due to the limited number of challenges used to define the PUFs. In addition, the challenges used to create conventional SRAM PUFs are relatively unsophisticated which makes it easier for an attacker to replicate the PUFs, leaving SRAMs and their contents vulnerable to intruders. Examples disclosed herein generate a strong PUF using challenge types that are more robust than conventional techniques and, thus, are much more difficult for an attacker to replicate.

Examples disclosed herein may be used to generate PUFs for SRAM. An example SRAM has multiple bit cells that make up the memory storage capacity (e.g., 256 Kilobytes (Kb), 512 Kb, 1 megabyte (M), etc.). An example SRAM bit cell is formed using six transistors, such as metal oxide semiconductor (MOS) transistors. Since the MOS transistors vary slightly (e.g., each transistor has different electrical and physical characteristics), the read access time of one bit cell will be different from another bit cell. A comparison of the read access times of multiple bit cells may be used to create a PUF.

SRAM needs to be powered to hold the data stored in the bit cells. If SRAM loses power, the data within the bit cells of the SRAM will be lost. When SRAM is powered up, bit cells of the SRAM will stabilize to a particular logic value due to differences in physical and/or electrical characteristics of the bit cells. The differences between such physical and/or electrical characteristics are random across different bit cells and SRAM devices due to variations in materials, timing, and/or other process parameters during an integrated circuit fabrication process. Due to such randomness, the startup logic states of the bit cells of SRAM are used to create a conventional PUF. Since conventional PUF generation techniques use only one challenge to determine an SRAM PUF (e.g., initialize the supply voltage), which produces one response (e.g., the startup logic states of all bit cells), conventional SRAM PUFs are considered weak PUFs. Other conventional techniques for determining PUFs (e.g., Arbiter PUF, ring oscillator PUF, etc.) that use more challenges, require additional hardware which is more complex and expensive to add to an integrated circuit.

Example methods, apparatus, and articles of manufacture disclosed herein may be used to create a strong SRAM PUF with more robust challenge types than a conventional weak SRAM PUF. Since a conventional SRAM PUF is determined based on startup logic states of individual bit cells in an SRAM, there is only one challenge (e.g., initialize the voltage supply) to determine the responses of the SRAM circuit. Furthermore, attacking techniques, such as delayering and probing an integrated circuit (IC), have been successful to determine a conventional PUF to clone the IC. However, examples disclosed herein use the read access times of individual bit cells to increase the number and quality of challenges used to generate a PUF. In this manner, examples disclosed herein may be used to substantially decrease or prevent instances of delayering and probing by unauthorized parties (e.g., parties attempting to determine the proposed PUF).

To increase the number and quality of challenges for an SRAM PUF, examples disclosed herein use read access times of bit cells of an SRAM circuit. For example, the amount of time that it takes for a sense amplifier to send the stored logic of a bit cell in response to a read voltage being applied to the bit cell is dependent on electrical and/or physical characteristics of the semi-conductive material used to produce the bit cells. The duration of time it takes for a bit cell to be read when prompted (e.g., read access time) is random between chips, yet repeatable on an individual chip. Each bit cell will have a different read access time. An example PUF can be determined based on a comparison of the read access times for two or more bit cells in the SRAM. A timer and/or a counter may be used to measure the read access times of the bit cells. In examples disclosed herein, a challenge is a comparison of the read access times of two or more bit cells given an initial value set in all of the bit cells. For example, one challenge may be a comparison of read access times of a first bit cell and a second bit cell when both bit cells are initiated to '1.' Additionally, different challenges may involve the same two bit cells, or a different pair of bit cells, with different initial logic pattern, or different initial logic pattern of bit cells that are not being measured. Alternatively, a comparison of read access times of more than two bit cells may be used as a challenge. Since each challenge is based on one comparison, examples disclosed herein increase the number of challenges due to the large amount of comparison possibilities. For example, if a PUF is based on a comparison of the read access times of two bit cells, about 2 trillion distinct challenges are possible in a one-megabit (1 Mb) SRAM circuit. If the PUF is based on a comparison of more than 2 bit cells, the number of possible challenges will be even larger. In this manner, examples disclosed herein use multiple challenges with unique responses to create strong PUFs.

Additionally, examples disclosed herein use more sophisticated challenges than conventional techniques by using bit cell read access times. Conventional SRAM PUFs are determined based on startup values of bit cells, such conventional SRAM PUFs have been vulnerable to intruders that have successfully used Near Infrared (NIR) photonic emissions to determine startup bit cell values in SRAM circuits, thus determining the corresponding PUFs. However, NIR photonic emissions cannot determine read access times of bit cells. Therefore, such NIR photonic emissions techniques would be useless to intrusively determine a timing-based PUF. Other methods of attacking SRAM PUFs include delayering and probing a chip to read out the stored code based on startup values of the bit cells. Delayering and probing the circuit would change the sensitive timing information, failing to determine a PUF of the circuit.

Additionally or alternatively, examples disclosed herein may be used to determine a count-based PUF. In such examples, when a read voltage is supplied to a bit cell, a memory controller associated with the SRAM circuit may increment a counter and poll a sense amplifier associated with the bit cell. The memory controller continues to poll the sense amplifier and increment the counter until the sense amplifier has finished sensing the value inside the bit cell. Once the sense amplifier receives the intended logic value of the bit cell, the memory controller records the count. The count may be used to determine the read access time of the bit cell.

An example method disclosed herein involves applying a voltage to a memory circuit. In some examples, a timer determines a first duration between the applying of the voltage and a first output of a first bit cell, the first output corresponding to a first value stored in the first bit cell. In such examples, the timer further determines a second duration between the applying of the voltage and a second output of a second bit cell, the second output corresponding to a second value stored in the second bit cell. In such examples, a processor determines a function based on a comparison of the first duration and the second duration, the function to establish an identification of a circuit that includes the memory array.

Another disclosed example method involves applying a voltage to a memory array. In such examples, a bit cell determiner measures, at a first time, a first output from a bit cell of the memory array. In such examples, the bit cell determiner further measures, at a second time later than the first time, a second output from the bit cell. In such examples, a processor determines a function based on a difference between the first output and the second output, the function to represent an identification of a circuit that includes the memory array.

Another disclosed example method involves applying a first voltage to a memory array. In such examples, a sense amplifier outputs a second voltage based on a comparison of a first read access time of a first bit cell of the memory array and a second read access time of a second bit cell of the memory array. In such examples, a processor determines a function based on the output, the function to establish an identification of a circuit that includes the memory array.

FIG. 1 is an illustration of the process of fabrication and authentication of an example SRAM chip in an example product. The illustration of FIG. 1 includes an example wafer 100, an example SRAM chip 102, an example PUF generator 104, and example network 106, and example database 108, an example product 110, an example user 112, and an example authentication host 114.

The example wafer 100 may be made from any semi-conductive material (e.g., high purity silicon). Chemical impurities (e.g., dopants) are introduced to the wafer 100 to create the electrical and/or physical characteristics associated with an SRAM chip 102. For example, the wafer 100 may be doped to create transistors that make up memory bit cells of the SRAM chip 102.

Example SRAM chip 102 is assembled from the example wafer 100. The SRAM chip 102 includes an SRAM array and a memory controller, as further described in FIG. 2. The SRAM array includes bit cells that store binary logic values (e.g., logic value '1' or logic value '0'). The memory controller writes logic values into the bit cells, reads the logic values from the bit cells, tracks bit cell failures, controls signals to the bit cells, receives challenges, and transmits responses as further described in FIG. 7. Due to the variation during the fabrication process, each SRAM chip will contain unique electrical and technical characteristics. Examples disclosed herein, use these unique characteristics of the SRAM chip 102 to create a PUF used to identify the SRAM chip 102.

During the PUF generation process, an example PUF generator 104 may be used to initiate challenges to the SRAM chip 102. The example PUF generator 104 provides instructions to a memory controller of the SRAM chip 102. The instructions include challenges to apply to the SRAM array to develop PUF data for later use (e.g., authentication, encryption, etc.). There are many variations of PUF parameters used to create challenges that are described herein to create PUF data. Thus, there are many challenges that can be applied. The PUF generator 104 may apply all possible challenges to the SRAM chip 102 at fabrication. Alternatively, to conserve memory, the PUF generator 104 may only apply a limited amount of challenges and may apply more challenges at a later time, as needed. The PUF generator 104 may apply the challenges directly to the SRAM chip 102 through a wired connection, or may alternatively apply challenges via a wireless connection or network.

An example network 106 communicates instructions, challenges, responses, and other data to various devices in the system of FIG. 1. The example network 106 may be a local area network, a wide area network (e.g., Internet, cloud, etc.), or any other type of communications network. The network 106 allows communications between an example database 108 and the example PUF generator 104.

An example database 108 stores PUF data associated with the example SRAM chip 102. The example database 108 contains and organizes PUF data from various SRAM chips and/or products. The example database 108 may be an external database facility, a local database, a cloud, and/or any other device capable of storing data. Additionally, the example database 108 may track which challenges were applied to the SRAM chip 102 during the fabrication process. In this manner, the database 108 is aware of additional challenges that may be applied to the SRAM chip 102 for additional PUF data. Additionally, the example database 108 may track which challenges were applied to the SRAM chip 102 during the authentication process. In this manner, the database 108 may communicate with the SRAM chip 102 to apply additional challenges to create more PUF data so that the authentication host 114 will not repeat a challenge.

Figure 2:
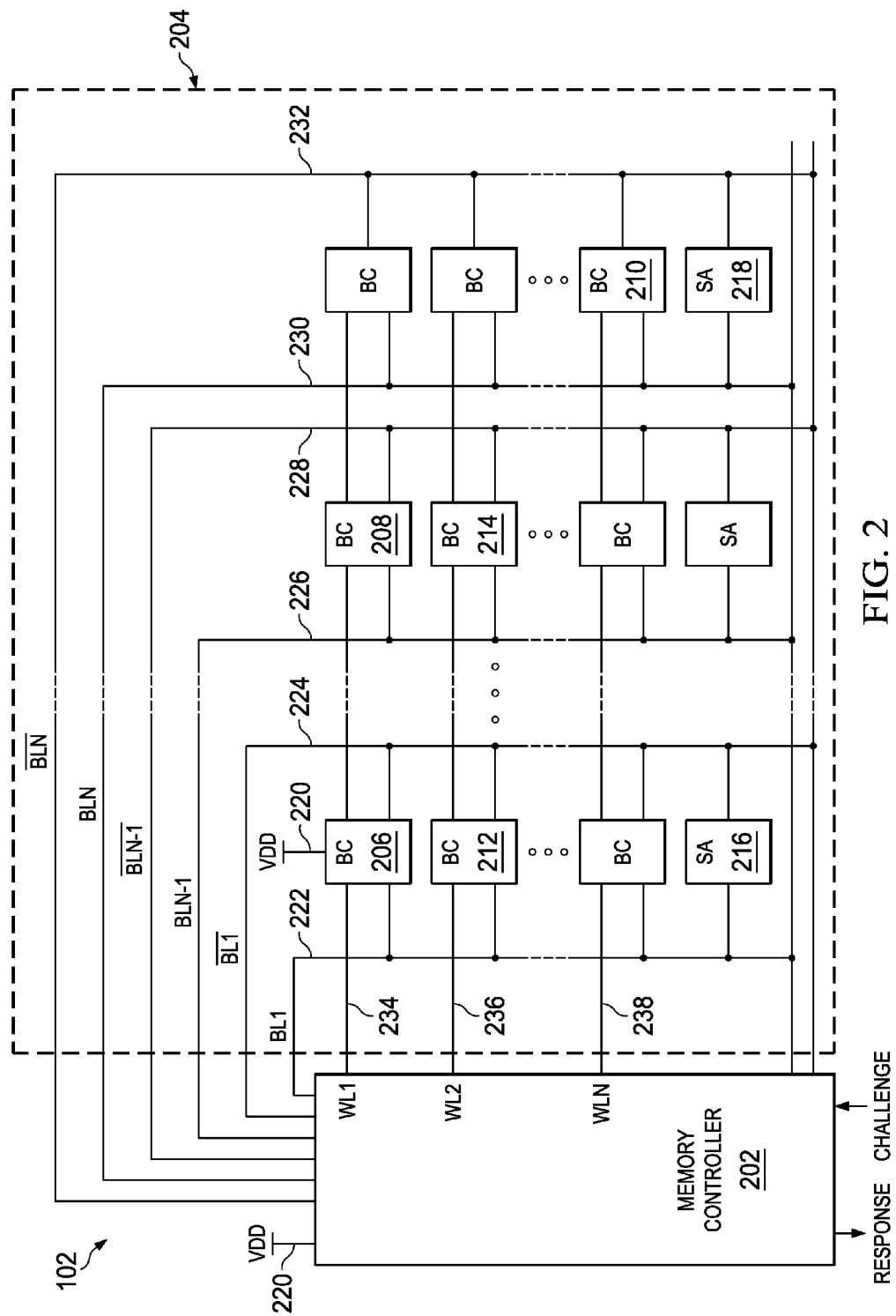
FIG. 2 is a portion of an example static random access memory (SRAM) device including an example controller to create a PUF.

Once the example SRAM chip 102 is fabricated, it may be placed on an example product 110 to be used by user 112. In FIG. 2, the example product 110 is a smart card. Alternatively, the example product 110 may be a key card with security permissions, a key generator, a mobile phone, a computing device, or any other product that contains the SRAM chip 102. Generally, the PUF associated with the SRAM chip 102 acts as a fingerprint (e.g., a unique identifier) to uniquely identify the example product 110 regardless of the data stored in the SRAM chip 102. Using the PUF to authenticate the example product 110 allows for more secure use of products with sensitive data. In addition, the PUF responses may be used to create encryption for securing data on or communicated to/from the example product 110.

During an authentication process, an example authentication host 114 authenticates the SRAM chip 102 and, thus, the product 110 by comparing challenge-response pairs from the SRAM chip 102 and the database 108. The authentication host 114 may be any device capable of reading data from the SRAM chip 102. In this example, the authentication host 114 is a smart card reader. In this manner, the authentication host 114 may receive data stored in the product 110. However, the product 110 may be an invalid product cloned by an attacker. The authentication host 114 verifies that the product 110 is valid by authenticating the product 110 based on PUF data of the SRAM chip 102. The authentication host 114 applies challenges to the SRAM chip 102 and compares the response to the challenge to challenge response pairs store in the database 108. Based on the comparison, the authentication host 114 determines whether the SRAM chip 102 is valid. An invalid or cloned product cannot produce correct responses to all of the challenges. Thus, the authentication host 114 prevents invalid products from being used.

In operation, the example SRAM chip 102 is created with the semi-conductive material of the example wafer 100. After fabrication of the SRAM chip 102, generation of the PUF begins. The example PUF generator 104 applies a series of challenges to the SRAM chip 102. A memory controller of the SRAM chip 102 applies the challenges to an SRAM array of the SRAM chip 102. The SRAM chip 102 transmits the responses to the challenges to the PUF generator 104. The example PUF generator 104 transmits the challenge-response pairs (e.g., PUF data) to the example database 108 through the example network 106 (e.g., to be stored for later authentication). In some examples, the database 108 may instruct the PUF generator 104 to apply challenges created by the database 108. In some examples, the memory controller of the SRAM chip 102 may create the challenges used to create PUF data. In some examples, the example database 108 and the example SRAM chip 102 communicate directly through network 106 without the need of the PUF generator 104. In some examples, the SRAM chip 102 may send all possible challenge-response pair combinations to the database 108 (e.g., through the database 108) for later authentication of the SRAM chip 102. Alternatively, the SRAM chip 102 may send a portion of the total challenge-response pairs (e.g., PUF data) to the database 108, and send additional challenge-response pairs (e.g. additional PUF data) to the database 108 as needed. The generation of the PUF is further described in FIGS. 3 and 4.

Once the PUF has been generated, the SRAM chip 102 is placed on/embedded in the example product 110 to be used by the example user 112. An authentication process is used to authenticate the product 110 for use. The authentication process begins when the authentication host 114 attempts to authenticate the example product 110. The authentication host 114 may retrieve challenge-response pairs from the example database 108 through the example network 106. The authentication host 114 may then use one or more challenges from the challenge-response pairs to challenge the SRAM chip 102 on the product 110. Once, the SRAM chip 102 applies the challenge, it transmits the response to the authentication host 114. In some examples, the authentication host 114 uses many challenges from the challenge-response pairs to challenge the SRAM chip 102. In this manner, it is more difficult for an attacker to randomly guess a correct response. The authentication host 114 compares the responses from the SRAM chip 102 to the responses from the database 108. If the responses match, the authentication host 114 verifies that the product 110 is valid and the product may be used. If the responses do not match, the authentication host 114 determines that the product 110 is not valid and may notify the database 108, the user 112, a fabricator of the SRAM chip 102, and/or a fabricator the product 110 of the discrepancy. Additionally, the authentication host 114 may set a flag and/or disable the SRAM chip 102 and/or alert the user 112 that the product containing the SRAM chip 102 has been disabled. The authentication process of the SRAM chip 102 is further described in FIGS. 5 and 6.

FIG. 2 is the example SRAM chip 102 of FIG. 1 including an example memory controller 202 to control operation of an example SRAM array 204. The example SRAM chip 102 includes example bit cells 206, 208, 210, 212, 214, example sense amplifiers 216, 218, an example voltage supply line VDD 220, example bitlines 222, 226, 230, example complementary bitlines 224, 228, 232, and example wordlines 234, 236, 238. The example memory controller 202 controls voltages sent to the SRAM array 204 to read/write binary logic values into bit cells of the SRAM array 204. The size of the SRAM chip 102 is based on the number of bit cells (e.g., 1 Kb, 128 Kb, 1 M, etc.) associated with the SRAM array 204.

Example bit cells 206, 208, 210, 212, 214 store binary logic values written by the memory controller 202. The bit cells 206, 208, 210, 212, 214 have two cross-coupled inverters that form a latch circuit. In some examples, the bit cells 206, 208, 210, 212, 214 contain six metal oxide semiconductor field effect transistor (MOSFET) transistors to form the latch circuit, but any amount of transistors may be used to create the bit cells 206, 208, 210, 212, 214. The latch circuit is coupled between a high rail and low voltage rail. The latch is connected between a high storage node and a low storage node. Each of the storage nodes is coupled to a bitline (e.g., the example bitlines 222, 226, 230) or a complementary bitline (e.g., the example complementary bitlines 224, 228, 232), via an access transistors whose gates are connected to a wordline (e.g., the example wordlines 234, 236, 238). The storage nodes are insulated when the access transistors are deactivated by applying a low voltage to the wordlines to allow the bit cells 206, 208, 210, 212, 214 to retain their logic values without refresh.

Example sense amplifiers 216, 218 are used to read the logic values stored in bit cells of the SRAM array 204. The sense amplifiers 216, 218 have a series of transistors configured to amplify a voltage differential between connected bitlines (e.g., the example bitlines 222, 226, 230) and connected complementary bitlines (e.g., the example complementary bitlines 224, 228, 232) to a normal logic level. The sense amplifiers 216, 218 output a logic value associated with a stored logic value of a bit cell based on the voltage differential. For example, the example sense amplifier 216 may output a logic value of '1' when a voltage on bitline BL1 222 is higher than a voltage on complementary bitline BL1 224.

The example memory controller 202 outputs a supply voltage on the example supply voltage line VDD 220. The supply voltage provides power to all bit cells, bitlines, wordlines, and sense amplifiers of the SRAM array 204. In some examples, the example supply voltage line VDD 220 may provide a first voltage to the bit cells and second, third, and fourth voltages to the bitlines, wordlines, and sense amplifiers respectively. Alternatively, the example supply voltage line VDD 220 may be a bus that supplies individual supply voltages to individual bit cells and sense amplifiers.

The example memory controller 202 outputs signals (e.g., voltages) on the example bitlines 222, 226, 230, example complementary bitlines 224, 228, 232, and wordlines 234, 236, 238. The memory controller 202 applies various signals to the various lines to write/read the logic values stored in bit cells 206, 208, 210, 212, 214 as further described below.

During a write operation of an example bit cell 206 (e.g., to write/store a logic value into an example bit cell 206), the example memory controller 202 applies signals to the example bitline 222 and the example complementary bitline 224 associated with the bit cell 206 based on which logic value is to be written. For example, if a '0' is to be written to (e.g., stored in) the bit cell 206, the memory controller 202 applies a '0' to the bitline 222 and a '1' to the complementary bitline 224. The memory controller 202 applies a high voltage to the wordline 234 to store the logic value (e.g., '0') within the bit cell 206.

During a read operation of an example bit cell 206, the memory controller 202 applies a pre-charged voltage to example bitline 222 and example complementary bitline 224. The memory controller 202 then applies a read voltage to a wordline 234 associated with the bit cell 206. In this manner, either the example bitline 222 or the example complementary bitline 224 is discharged depending on the stored logic value (e.g. '0' or '1'). The sense amplifier 216 amplifies the small voltage difference between the bitline 222 and the complementary bitline 224 into a larger logic level. The sense amplifier 216 outputs the stored logic value of the bit cell 206 back to the memory controller 202.

For the bit cells 206, 208, 210, 212, 214 to maintain their logic value (e.g., '0' or '1'), a supply voltage must be applied on the supply voltage line VDD 220 to the bit cells 206, 208, 210, 212, 214. If the voltage supply is not applied, all of the bit cells 206, 208, 210, 212, 214 will lose their logic value. However, the read access times (e.g., a duration of time to output a logic value after a read operation is initiated) of the bit cells 206, 208, 210, 212, 214 will be different. The read access times of the bit cells 206, 208, 210, 212, 214 depend on the values initially stored (e.g., initial logic pattern) of the bit cell 206, 208, 210, 212, 214 and the physical and electrical characteristics of the bit cells 206, 208, 210, 212, 214. The memory controller 202 determines a read access time by initializing the bit cells with predetermined logic values (e.g., an initial logic pattern), reading the stored values of the bit cells, monitoring the read access times of the bit cells, and comparing the read access times of the bit cells.

Figure 3:
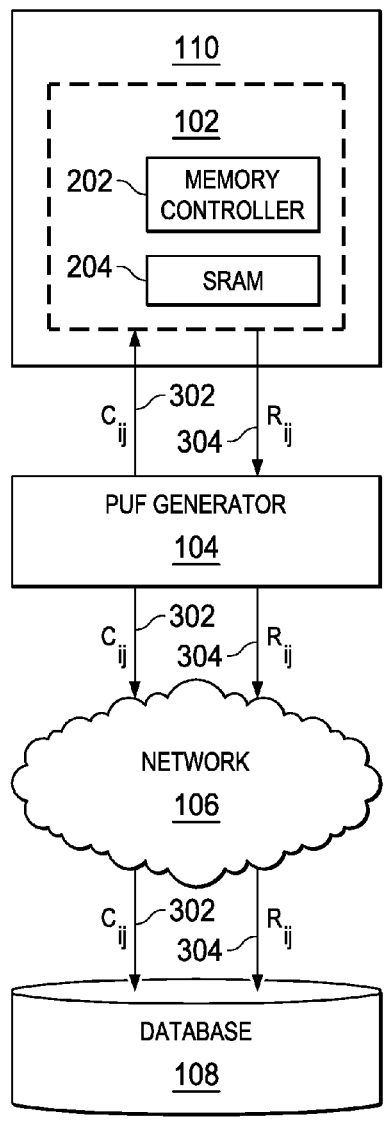
FIG. 3 is an example SRAM in communication with an example database for use in connection with the example PUF techniques disclosed herein.

FIG. 3 is an illustration of the process of generating a PUF for an example product 110 which includes an example SRAM chip 102. The illustration of FIG. 3 includes the example SRAM chip 102, the example product 110, the example PUF generator 104, the example network 106, and the example database 108 of FIG. 1. The illustration of FIG. 3 further includes the example memory controller 202 and the example SRAM array 204 of FIG. 2. The illustration of FIG. 3 further includes example challenges $C_{ij}$ 302 and example responses $R_{ij}$ 304.

The example PUF generator 104 of FIG. 3 transmits instructions to create PUF data using challenges $C_{ij}$ 302 to the example database 108 and to the example memory controller 202 in the SRAM chip 102. The instructions specify PUF parameters for influencing the read access times of bit cells of the SRAM array 204. For example, the instructions may instruct the memory controller 202 to initialize all the bit cells of the SRAM array 204 to '0.' Additional instructions may include setting the supply voltage, specifying which bit cells to read, when to read the bit cells, how to rank the read access times of the measured bit cells, etc. Once the initial logic pattern (e.g., which bit cells store '1' and which bit cells store '0') is written to the bit cells, the read access times of one or more bit cells are determined. Alternatively, the instructions may be initiated by the memory controller 202, the database 108, or from any other source outside of the SRAM chip 102. The memory controller 202 determines the read access times based on methods described herein.

Once the instructions are executed by the memory controller 202, the memory controller 202 generates responses $R_{ij}$ 304 (e.g., PUF data) and sends the responses $R_{ij}$ 304 to the PUF generator 104. The PUF generator 104 transmits the challenges $C_{ij}$ 302 and the responses $R_{ij}$ 304 to the example database 108 via the example network 106. The database 108 stores PUF data by associating the responses $R_{ij}$ 304 with the challenges $C_{ij}$ 302. The PUF data will be used to authenticate the SRAM chip 305 at a later time. The database 320 also stores PUF data for other fabricated SRAM chips. In some examples, the SRAM chip 102 may repeat the process with a new set of challenges to increase the size and complexity of the PUF data in the database 108. In some examples, the SRAM chip 102 may initially send a limited number of challenge response pairs to the PUF generator 104 to be stored in the database 108, and may send additional challenge response pairs as needed to expand the size of the PUF data (e.g., when the number of challenges sent by an authentication host 114 has been exhausted, when instructions are sent to create more PUF data, etc.).

Figure 4:
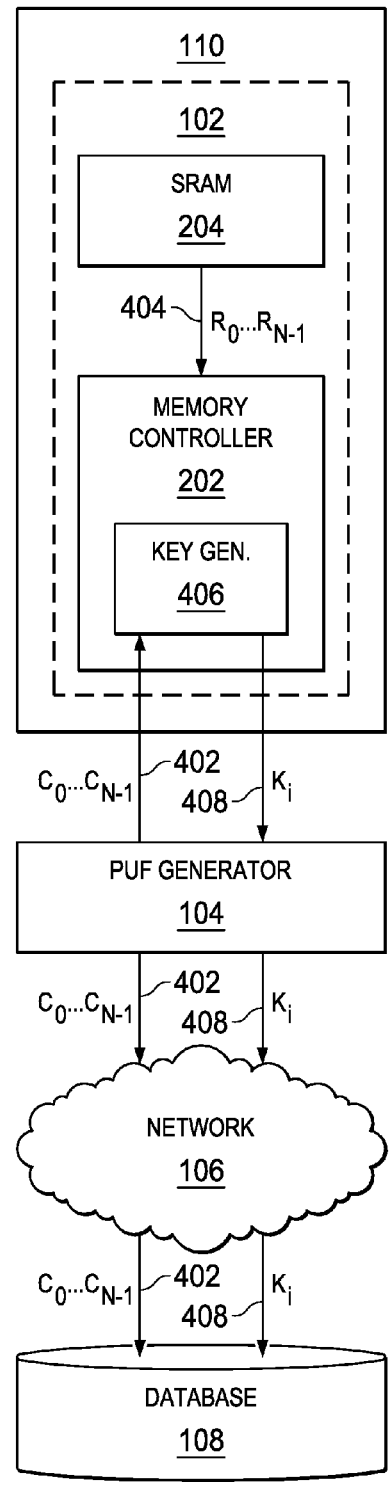
FIG. 4 is an example apparatus to create an example security key based on an example SRAM PUF and store a security key in an example database.

FIG. 4 shows an illustration of an alternative process of generating a PUF for an example SRAM chip 102. The illustration of FIG. 4 includes the example SRAM chip 102, the example product 110, the example PUF generator 104, the example network 106, and the example database 108 of FIG. 1. The illustration of FIG. 4 further includes the example memory controller 202 and the example SRAM array 204 of FIG. 2. The illustration of FIG. 4 further includes example challenges $C_0 \ldots C_{N-1}$ 402, example responses $R_0 \ldots R_{N-1}$ 404, an example key generator 406, example keys $K_i$ 408.

The example PUF generator 104 of FIG. 4 transmits instructions to create PUF data using challenges $C_0 \ldots C_{N-1}$ 402 to the example database 108 and to the example memory controller 202 in the SRAM chip 102. The instructions specify PUF parameters for determining read access times of bit cells of the SRAM array 204. For example, the instructions may instruct the memory controller 202 to initialize all the bit cells of the SRAM array 204 to '0.' Additional instructions may include setting the supply voltage, specifying which bit cells to read, when to read the bit cells, how to rank the read access times of the measured bit cells, etc. Once the initial logic pattern (e.g., which bit cells store '1' and which bit cells store '0') is written to the bit cells, the read access times of one or more bit cells are determined. Alternatively, the instructions may be initiated by the memory controller 202, the database 108, or from any other source outside of the SRAM chip 102. The memory controller 202 determines the read access times based on methods described herein.

Once the instructions are executed by the memory controller 202, the memory controller 202 generates PUF data by gathering data relating to the responses and sends the PUF data to an example key generator 406. The key generator 406 creates one or more unique keys $K_i$ 408 based on the PUF data. The keys $K_i$ 408 will be used to authenticate the SRAM chip 102 at a later time using either symmetric key or public key cryptography techniques. The keys $K_i$ 408 are securely sent to the PUF generator 104. The PUF generator 104 transmits the $K_i$ 408 to the example database 108 via the example network 106 for storage. The database 108 also stores keys for other fabricated SRAM chips. The SRAM chip 102 may repeat the process with a new set of challenges to generate multiple keys based on different challenges. In some examples, the SRAM chip 102 may initially send a limited number of keys to the PUF generator 104 to be stored in the database 108, and may send additional keys as needed to expand the number of keys for the SRAM chip 102 (e.g., when the number of keys used by an authentication host 114 has been exhausted, when instructions are sent to create more keys, etc.).

Figure 5:
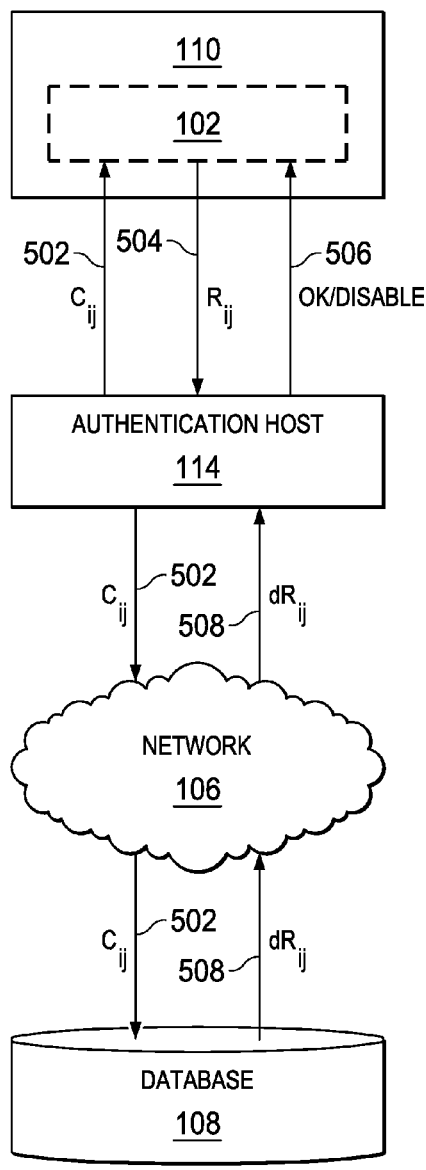
FIG. 5 is an example of authenticating an example SRAM circuit based on a PUF.

FIG. 5 is an example authentication of an example product 110 containing an example SRAM chip 102. The illustration includes the example SRAM chip 102, the example product 110, the example authentication host 114, the example network 106, and the example database 108 of FIG. 1. The illustration further includes example challenges $C_{ij}$ 502, example responses $R_{ij}$ 504, an example ok/disable signal 506, and example database responses $dR_{ij}$ 508.

When a user of the example product 110 attempts to use the product 110, the example authentication host 114 authenticates the example SRAM chip 102 associated with the product 110. The example authentication host 114 authenticates the product 110 by sending instructions to the SRAM chip 102 including example challenges $C_{ij}$ 502. The example authentication host 114 also sends the example challenges $C_{ij}$ 502 as well as product 110 identification information to the example database 108 via the example network 106. In response to receiving the challenges $C_{ij}$ 502 and identifying information from the authentication host 114, the example database 108 sends stored database responses $dR_{ij}$ 508 associated with the challenges $C_{ij}$ 502 for the SRAM chip 102. When the SRAM chip 102 receives the challenges $C_{ij}$ 502 from the authentication host 114, a memory controller 202 of the SRAM chip 102 applies the challenges to an SRAM array 204 to determine and transmit the example responses $R_{ij}$ 504 to the authentication host 114. Alternatively, the authentication host 114 may first retrieve PUF data from the database 108 before applying a challenge $C_{ij}$ 502 to the SRAM chip 102. In this manner, the authentication host 114 can use stored challenge-response pairs from the PUF data in the database 108 to test the SRAM chip 102 (e.g., when the database 108 contains a limited number of challenge-response pairs).

In response to receiving the example responses $R_{ij}$ 504 and the example database responses $dR_{ij}$ 508 via the network 106, the example authentication host 114 compares the responses $R_{ij}$ 504 and the database responses $dR_{ij}$ 508. If the PUF data (e.g., challenge-response pairs) acquired from example SRAM chip 102 matches the PUF data from the database 108, the product 110 is authenticated. Once authenticated, the authentication host 114 transmits an example 'OK' (e.g., approval) signal 506 to the product 110 and the product 110 can be utilized. However, if the data from two PUFs do not match, the example authentication host 114 sends a disable signal 506 to the SRAM chip 102 to deactivate the SRAM chip 102. Additionally, the authentication host 114 may contact a user of the product 110 (e.g., the example user 112 of FIG. 1), the database 108, and/or the manufacturer of the product 110 and/or SRAM chip 102, to indicate that the product 110 has been disabled via a wired or wireless connection. Alternatively, the example authentication host 114 may send a message to another server and/or database to indicate a discrepancy between the PUF of the SRAM chip 102 and the PUF stored in the example database 108. Alternatively, the SRAM chip 102 may send a signal to the user to indicate the discrepancy between the PUF of the SRAM chip 102 and the PUF stored in the database 108.

Figure 6:
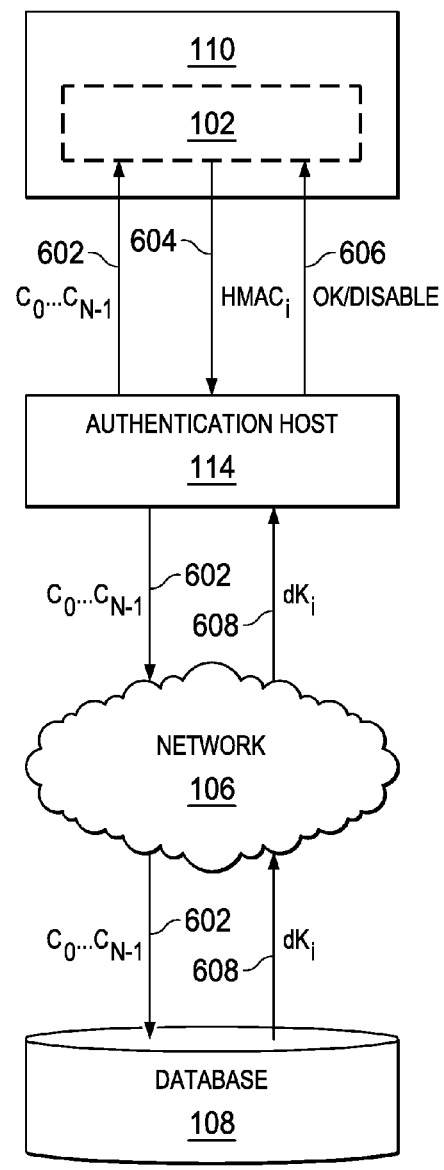
FIG. 6 is an example of authenticating an example SRAM circuit based on a keyed HMAC.

FIG. 6 is an example authentication of an example product 110 containing an example SRAM chip 102. The illustration includes the example SRAM chip 102, the example product 110, the example authentication host 114, the example network 106, and the example database 108 of FIG. 1. The illustration further includes example challenges $C_0 \ldots C_{N-1}$ 602, example HMAC 604, an example ok/disable signal 606, and an example database key $dK_i$ 608.

When a user of the example product 110 attempts to use the product 110, the example authentication host 114 authenticates the example SRAM chip 102 associated with the product 110. The example authentication host 114 authenticates the product 110 by sending instructions to the SRAM chip 102 including example challenges $C_0 \ldots C_{N-1}$ 602. The example authentication host 114 also sends the example challenges $C_0 \ldots C_{N-1}$ 602 as well as product 110 identification information to the example database 108 via the example network 106. In response to receiving the example challenges $C_0 \ldots C_{N-1}$ 602 and identifying information from the authentication host 114, the example database 108 sends an example stored database key $dK_i$ 608 for the SRAM chip 102. When the SRAM chip 102 receives challenges from the authentication host 114, a memory controller 202 in the SRAM chip 102 applies the challenges $C_0 \ldots C_{N-1}$ 602 to the SRAM array 204 to determine the corresponding key. The SRAM chip 102 uses this key to compute an example HMAC 604 to be transmitted to the authentication host 114. Alternatively, the authentication host 114 may first retrieve the challenges $C_0 \ldots C_{N-1}$ 602 from the database 108 before applying the challenges $C_0 \ldots C_{N-1}$ 602 to the SRAM chip 102. In this manner, the authentication host 114 can use stored challenge-response pairs from PUF data in the database 108 to test the SRAM chip 102 (e.g., when the database 108 contains a limited number of challenge-response pairs).

In response to receiving the example HMAC 604, the example authentication host 114 uses the database key $dK_i$ 608 from the network 106 to compute the corresponding $dHMAC_i$. The authentication host 114 then compares the chip's HMAC 604 to the $dHMAC_i$ it computed based on the database key $dK_i$ 608 from the network 106. If the HMAC 604 acquired from example SRAM chip 102 matches the $dHMAC_i$ computed based on $dK_i$ 608 from the database 108, the product 110 is authenticated, an 'OK' (e.g., approval) signal 606 is sent to the product 110, and the product 110 can be utilized. However, if the two HMACs do not match, the authentication host 114 sends a disable signal 606 to the SRAM chip 102 to deactivate the SRAM chip 102. Additionally, the authentication host 114 may contact a user of the product 110 (e.g., the example user 112 of FIG. 1), the database 108, and/or the manufacturer of the product 110 and/or SRAM chip 102 to indicate that the product 110 has been disabled via a wired or wireless connection. Alternatively, the example authentication host 114 may send a message to another server and/or database to indicate a discrepancy between the PUF of the SRAM chip 102 and the PUF stored in the example database 108. Alternatively, the SRAM chip 102 may send a signal to the user to indicate the discrepancy between the PUF of the SRAM chip 102 and the PUF stored in the database 108.

Figure 7:
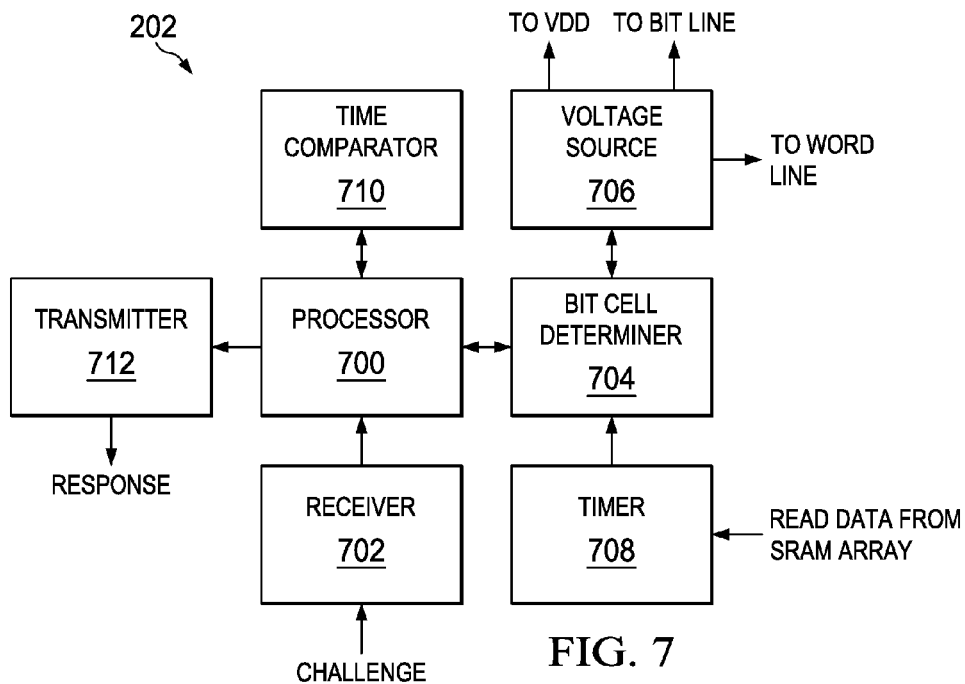
FIG. 7 is an example memory controller to control an SRAM circuit to create a PUF using an example timer.

FIG. 7 is a block diagram of an example implementation of the example memory controller 202 of FIG. 2, disclosed herein, to create a PUF and/or authenticate a chip containing an SRAM. While the example memory controller 202 of FIG. 7 is described in conjunction with the example SRAM array 204, the memory controller 202 may be utilized to control any memory array. The example memory controller 202 is implemented to control the example SRAM array 204 in the example product 110 and/or any device where SRAM is used.

The memory controller 202 of FIG. 7 includes an example processor 700, an example receiver 702, an example bit cell determiner 704, an example voltage source 706, an example timer 708, an example time comparator 710, and an example transmitter 712. The processor 700 receives challenges, executes instructions to the rest of the memory controller 202, processes data, and transmits responses to the example PUF generator 104, the example database 108, and/or an authentication host 114.

The example receiver 702 receives data from an external device, via a wired or wireless connection, and sends the received PUF data to the processor 700 for further processing. For example, the receiver 702 receives challenges from the example PUF generator 104, the example database 108, and/or the example authentication host 114 and sends the PUF data to the processor 700 for further processing.

The example bit cell determiner 704 determines which wordlines and bitlines are associated with a bit cell. For example, the processor 700 may instruct the bit cell determiner 704 to read a particular logic value from the bit cell. In this manner, the example bit cell determiner 704 determines which bitlines and which wordline are associated with the bit cell. The example bit cell determiner 704 applies a signal, via the example voltage source 706, to the appropriate wordlines and bitlines to read the logic value stored in the bit cell. The example bit cell determiner 704 receives the read data, including read access time data, from the example timer 708 and sends the read data to processor 700 for further processing. Additionally, the example bit cell determiner 704 may write a logic value into a bit cell of the SRAM array 204. In this manner, the example bit cell determiner 704 applies a signal to appropriate wordline and bitlines to write the initial logic pattern into the bit cells.

The example voltage source 706 applies voltages to various components of the SRAM array 204. In some examples, the example voltage source 706 is a voltage regulator capable of outputting one or more voltage levels. In some examples, the example voltage source 706 is a voltage source that can be lowered by enabling a diode-connected transistor in series with the voltage supply. Alternatively, the voltage source 706 can be any circuit capable of outputting one or more voltage levels. The example voltage source 706 applies voltages supplies voltages to bitlines, wordlines, and supply voltage lines of the SRAM array 204 to read and/or write logic values into the bit cells of the SRAM array 204. In some examples, the example voltage source 706 controls signals to enable sense amplifiers of an SRAM array, as further described in FIG. 11.

The example timer 708 records and tracks the read access times of bit cells of the SRAM array 204. The timer 708 may be implemented using hardware, software, and/or firmware. The example timer 708 communicates the recorded time to the example processor 700, via the bit cell determiner 704 for further processing.

The example time comparator 710 compares read access times of bit cells in to determine an order of the read access times. The example time comparator 710 may compare the read access times of two or more bits. In some examples, the example time comparator 710 determines which bit cell is fastest given read access times of a group of bit cells. Alternatively, the example time comparator 710 determines an order of read access times of bit cells.

The example transmitter 712 receives data from the processor 700 and transmits the PUF data to an external device via a wired or wireless connection. For example, the transmitter 712 transmits responses and identification data from the memory controller 202 to the example PUF generator 104, the example authentication host 114, and/or the example database 108 of FIG. 1.

In operation, the example receiver 702 of FIG. 7 receives data, via wired or wireless communication, from the example PUF generator 104, the example database 108, and/or the example authentication host 114. The processor 700 receives and processes the data from the receiver 702. The data may contain instructions including challenges to be sent to the processor 700. The instructions may include PUF parameters including which bit cell's read access times are to be monitored, initial parameters for the challenge, and a type of response to be sent back to the example PUF generator 104, the example database 108, and/or the example authentication host 114. For example, the challenge may be an order of read access times for five specific bit cells in an SRAM circuit while the initial logic pattern of all of the bit cells of the SRAM circuit is '1.'

Before the example processor 700 applies challenges to the SRAM array 204 of FIG. 1, the processor 700 applies the initial parameters based on the data received by the receiver 702 by writing values associated with the initial logic values to the bit cell(s) of the SRAM array 204. The processor 700 sends initialization data to the example bit cell determiner 704. The bit cell determiner 704, equipped with the initialization data, determines which bitline and wordline are associated with a bit cell(s) to be written. The bit cell determiner 704 also determines which value to write to the bit cell(s). The bit cell determiner 704 sends the bit cell information to an example voltage source 706. The voltage source 706 applies an appropriate voltage to the wordlines and bitline associated with the bit cell(s) to write an initial logic pattern for the bit cell(s). The bit cell determiner 704 repeats this process until all initial bit cell values have been written to the bit cells.

Once the initial logic pattern has been applied to the bit cells of the example SRAM array 204, the example processor 700, of FIG. 7, instructs the example bit cell determiner 704 to read the stored value of one or more bit cells, depending on the PUF parameters from the data received from the example receiver 702. The bit cell determiner 704, equipped with the challenge data, determines which bitline(s) and wordline(s) are associated with the bit cell(s) to be read. The bit cell determiner 704 sends instructions regarding the read operation to the voltage source 706. The voltage source 706 applies an appropriate voltage to the wordline and bitlines associated with the bit cell(s) to read the value(s) stored in the bit cell(s).

The example timer 708 is initiated when the voltage source 706 sends signals to read a bit cell of the SRAM array 204. The example timer 708 records the read access times of the bit cells (e.g., the time it takes for a value of a bit cell to be read after a read signal is sent to the bit cell). Once the timer 708 receives an output from a sense amplifier associated with a bit cell, the timer 708 records a duration of time from when the read signal was initiated by bit cell determiner 204, to when the bit cell determiner 704 determines that the bit cell has been read. If read access times of multiple bit cells are being monitored, the timer 708 will continue monitoring the read access times until each bit cell to be read has been read. Alternatively, the timer 708 may include a time-to-digital converter. In this manner, the timer 708 may convert the read access times into a digital (e.g., binary) output.

Once the example processor 700 of FIG. 7 receives the recorded read access time(s) of the monitored bit cell(s) from the example timer 708 through the bit cell determiner 704, the processor 700 sends data relating to the read access times of the bit cell(s) to the example time comparator 710. The example time comparator 710 compares the read access times of the monitored bit cells to create a response corresponding to PUF parameters set by the challenge data. The processor 700 sends the PUF parameters to the time comparator 710 to create an appropriate response. The time comparator 710 may create a response by determining which monitored bit cell is the fastest/slowest, an order of the read access times of the bit cells, or any other comparison of the read access times of the bit cells. The time comparer 710 sends the response to the processor 700. The processor 700 aggregates the data to create PUF data and relays the PUF data to the example transmitter 712. The example transmitter 712 transmits the response, via wired or wireless communication, back to the example PUF generator 104, the example database 108, and/or the example authentication host 114. Alternatively, the example processor 700 may use the PUF data to create a key. In this manner, a cryptographic hash function may be applied to the key creating a HMAC. The transmitter 712 transmits the HMAC to the example PUF generator 104, the example database 108, and/or the example authentication host 114.

Figure 8:
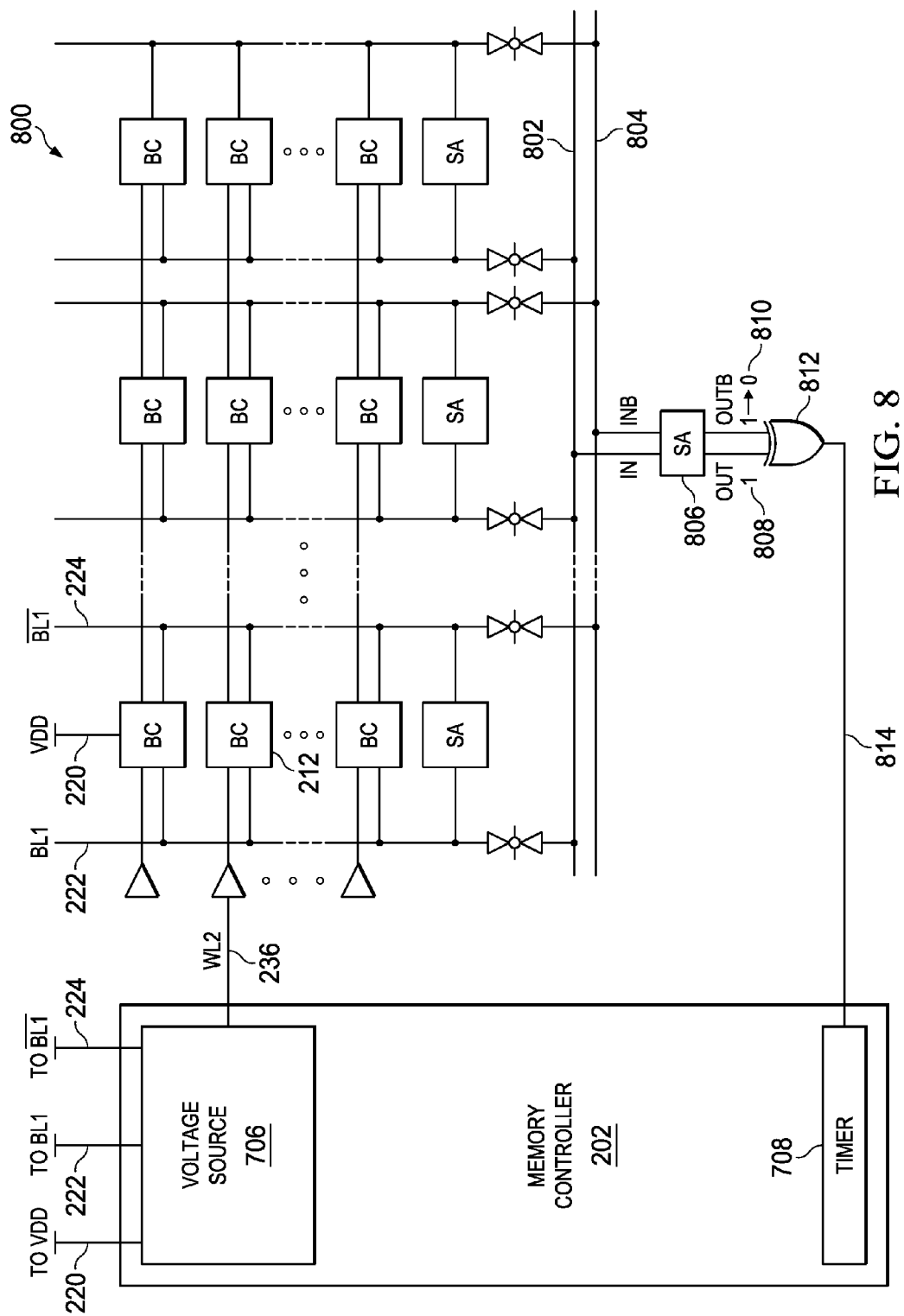
FIG. 8 is an example SRAM circuit to determine read access times of each bit cell individually and compare the read access times of the bit cells to create a PUF.

FIG. 8 is an example SRAM circuit 800 to determine read access times of each bit cell individually and compare the read access times of the bit cells to create a PUF. The example SRAM circuit 800 comprises the example memory controller 202, the example supply voltage line VDD 220, the example bitline BL1 222, the example complementary bitline BL1 224, and the example word line WL2 236 of FIG. 2. The example SRAM circuit 800 further comprises the example voltage source 706 and the example timer 708 of FIG. 7. The example SRAM circuit 800 further comprises example input lines 802, 804, an example sense amplifier 806, example output lines 808, 810, an example exclusive or (XOR) gate 812, and an example XOR output 814.

The example input lines 802, 804 feed the voltage of the example bitline BL1 222 and the example complementary bitline BL1 224 into the example input lines 802, 804. The input lines 802, 804 are coupled to the inputs of the example sense amplifier 806. The example sense amplifier 806 amplifies the input voltage to a normal logic voltage. After the example sense amplifier 812 triggers, the example output lines 808, 810 provide a digital representation of the input voltages. The example XOR gate 812 receives two inputs to create an XOR output 814 of the inputs. In this example, the two inputs are output lines 808, 810.

In some examples, when a challenge is applied to the SRAM circuit 800, the bit cells are first initialized to initial logic pattern as set by PUF parameters of the challenge. Additionally, a voltage applied to the supply voltage line VDD 220 may be lowered to, for example, a retention mode voltage. Lowering the supply voltage to the retention mode voltage slows down read access times of bit cells of an SRAM circuit. Slowing down the read access times of the bit cells allows for an easier comparison of the read access times of the bit cells.

Before a challenge (e.g., read access time measurement) begins, the memory controller pre-charges the example bitline BL1 222 and complementary bitline BL1 224 of FIG. 8 to a high voltage (e.g., equal to the supply voltage VDD 220 or half of the supply voltage VDD 220). The memory controller also resets the sense amplifier 806. In this manner, the output lines 808, 810 will both output logic value '1.' Since both output lines 808, 810 will have a logic value of '1', the example XOR output 814 (e.g., from the XOR gate 812) will be a logic value '0,' indicating that the example bit cell 212 has not yet been read.

To initiate a read operation, the memory controller 202 applies a high voltage to the example wordline WL2 236 of FIG. 8. The example timer 708 is initiated by the application of the high voltage to the example wordline WL2 236 to monitor the read access time of bit cell 212. As displayed in the example SRAM circuit 800, if a logic value '1' is stored in the bit cell 212, the example pre-charged complementary bitline BL1 224 will be discharged by the bit cell 212. In contrast the bitline BL1 222 is not discharged and stays near its pre-charged voltage. In this manner, the input line 802 will have a larger voltage (e.g., logic value '1') than the discharged input line B 804 (e.g., logic value '0'). The example sense amplifier 806 will sense the difference between input lines 802, 804. After sense amplifier 806 determines whether input line 802 or input line B 804 is at a higher voltage, it sets either the example output line 808 or an example output line B 810 to logic value '0' depending on the polarity of the input. The output line 808 and output line B 810 are sent to the example XOR gate 812. In the example of FIG. 8 since the output line 808 is logic value '1' and the output line B 810 is switched '0,' the XOR output 814 is switched to logic value '1,' which is sent to the example timer 708. The XOR output 814 switching from a logic value '0' to a logic value '1' indicates that the bit cell 212 has been read. The timer 708 associates the switching with a read access time of the bit cell 212. Additionally, the timer 708 may convert the read access time to a digital value using a time-to-digital converter. The timer 708 sends the read access time to the example processor 700 for further processing. The SRAM circuit 800 may repeat this process with a new bit cell to receive read access times of multiple bit cells of the SRAM circuit 800. Alternatively, the SRAM circuit 800 may repeat the process with the same PUF parameters to verify the prior PUF response.

Figure 9:
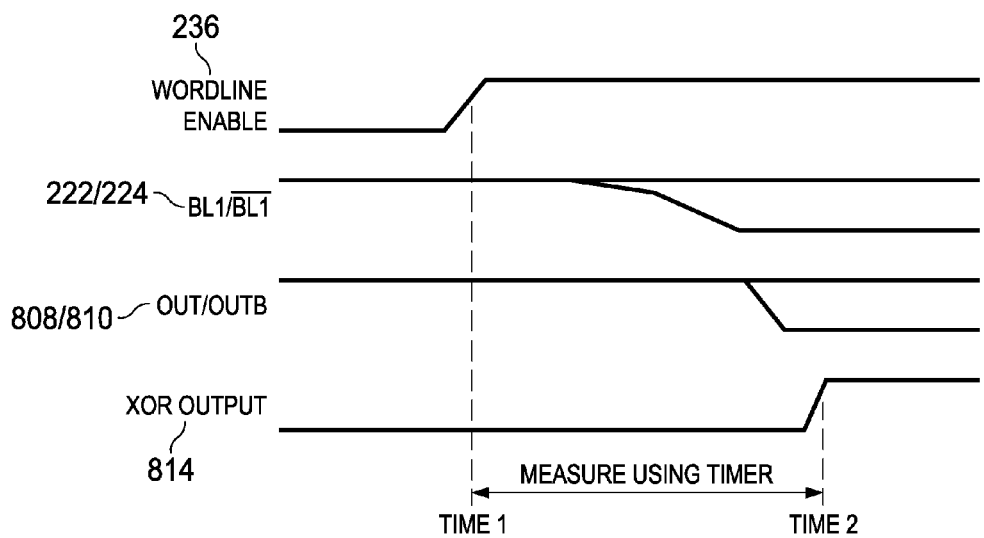
FIG. 9 is a graph displaying an example timing of an example read access time for the example SRAM circuit of FIG. 8.

FIG. 9 is a graph displaying an example timing of an example read access time for the example SRAM circuit 800 of FIG. 8. The graph displays the voltage sequence during a read operation. The graph comprises the example wordline WL2 236, the example bitline BL1 222, the example complementary bitline BL1 224, the example output lines 808, 810, and the example XOR output 814 of FIG. 8.

As explained above, before Time 1, the bitlines 222, 224 are pre-charged to a high voltage. The output lines 808, 810 from sense amplifier 806 are also reset to a high voltage. Since both output line 808, 810 are high the XOR output 814 is low. At Time 1, the wordline WL2 236 is enabled to read a bit cell. Once the wordline WL2 236 is enabled, either the bitline BL1 222 or the complementary bitline BL1 224 will begin to discharge depending on if the bit cell 212 stores a logic value of '0' or a logic value of '1.' Once the bitline associated with the stored value discharges (e.g., if the bit cell 212 stores a logic value of '1,' then the complementary bitline BL1 224 discharges), the sense amplifier 806 changes the output line B 810 associated with the stored discharged bitline (e.g., the complementary bitline BL1 224) from a logic value '1' to a logic value '0,' while the output line 808 (e.g., associated with bitline 224) stays at a '1.' At time 2, the example XOR gate 812 adjusts the XOR output 814 from a '0' to a '1' to indicate a differential in the output lines 808, 810. Once the XOR output 814 changes to a '1,' the example timer 708 records a duration of time from Time 1 to Time 2. The duration of time is indicative of the read access time for the bit cell 212.

Figure 10:
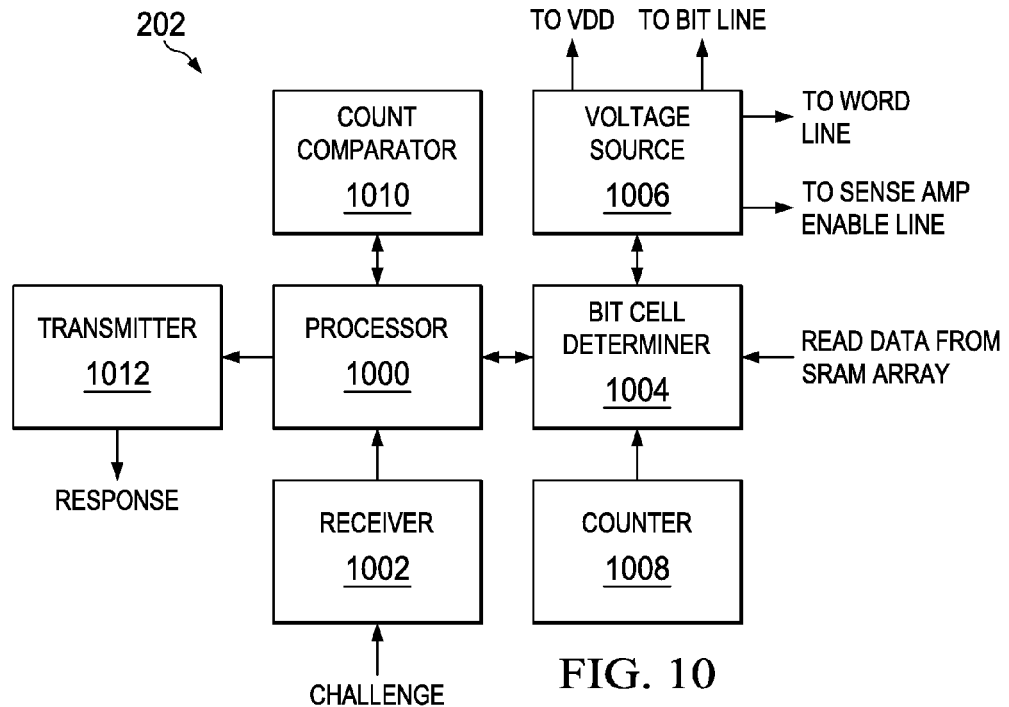
FIG. 10 is an example memory controller to control an SRAM circuit to create a PUF using an example counter.

FIG. 10 is a block diagram of an example implementation of the example memory controller 202 of FIG. 1, disclosed herein, to create an example PUF and/or authenticate an SRAM chip. While the example memory controller 202 of FIG. 10 is described in conjunction with the SRAM chip 102 of FIG. 2, the memory controller 202 may be utilized to control any memory array. The example memory controller 202 is implemented to control an SRAM chip (e.g., the example SRAM chip 102) in a product (e.g., the example product 110) and/or any device where SRAM is used.

The memory controller 202 of FIG. 10 includes an example processor 1000, an example receiver 1002, an example bit cell determiner 1004, an example voltage source 1006, an example counter 1008, an example count comparator 1010, and an example transmitter 1012. The processor 1000 receives challenges, executes instructions to the rest of the memory controller 202, processes data, and transmits responses to the example PUF generator 104, the example database 108, and/or an authentication host 114.

The example receiver 1002 receives data from an external device, via a wired or wireless connection, and sends the received PUF data to the processor 1000 for further processing. For example, the receiver 1002 receives challenges from the example PUF generator 104, the example database 108, and/or the example authentication host 114 and sends the PUF data to the processor 1000 for further processing.

The example bit cell determiner 1004 determines which wordlines and bitlines are associated with a bit cell. For example, the processor 1000 may instruct the bit cell determiner 1004 to read a particular logic value from the bit cell. In this manner, the example bit cell determiner 1004 determines which bitlines and which wordline are associated with the bit cell. The example bit cell determiner 1004 applies a signal, via the example voltage source 1006, to the appropriate wordlines and bitlines to read/write the logic value stored in the bit cell. The example bit cell determiner 1004 controls a sense amplifier enable line via the example voltage source 1006 as further described in FIGS. 13-15. Additionally, the example bit cell determiner 1004 may write a logic value into a bit cell of the SRAM array 204. In this manner, the example bit cell determiner 1004 applies a signal to appropriate wordline and bitlines to write the initial logic pattern into the bit cells.

The example voltage source 1006 applies voltages to various components of the SRAM array 204. In some examples, the example voltage source 706 is a voltage regulator capable of outputting one or more voltage levels. In some examples, the example voltage source 706 is a voltage source that can be lowered by enabling a diode-connected transistor in series with the voltage supply. Alternatively, the voltage source 706 can be any circuit capable of outputting one or more voltage levels. The example voltage source 1006 applies voltages supplies voltages to bitlines, wordlines, and supply voltage lines of the SRAM array 204 to read and/or write logic values into the bit cells of the SRAM array 204. In some examples, the example voltage source 1006 controls signals to enable sense amplifiers of an SRAM array, as further described in FIG. 13.

The example counter 1008 records and tracks a number of sense enables required to read a logic value stored in a bit cell of the SRAM array 204. The counter 1008 may be implemented using hardware, software, and/or firmware. The example counter 1008 communicates the number of sense enables to the example processor 1000, via the bit cell determiner 1004 for further processing.

The example count comparator 1010 compares read access times of bit cells in order to determine an order of the read access times. The example count comparator 1010 may compare the read access times of two or more bits. In some examples, the example count comparator 1010 determines which bit cell is fastest given read access times of a group of bit cells. Alternatively, the example count comparator 1010 determines an order of read access times of bit cells.

The example transmitter 1012 receives data from the processor 1000 and transmits the PUF data to an external device via a wired or wireless connection. For example, the transmitter 1012 transmits responses and identification data from the memory controller 202 to the example PUF generator 104, the example authentication host 114, and/or the example database 108 of FIG. 1.

In operation, the example receiver 1002 of FIG. 10 receives data, via wired or wireless communication, from the example PUF generator 104, the example database 108, and/or the example authentication host 114. The processor 1000 receives and processes the data from the receiver 1002. The data may contain instructions including challenges to be sent to the processor 1000. The instructions contain PUF parameters for the challenges including which bit cell's read access times are to be monitored, initial parameters for the challenge, and a type of response to be sent back to the example PUF generator 104, the example database 108, and/or the example authentication host 114. For example, the challenge may be an ordering of read access times for five specific bit cells in an SRAM circuit while the initial value of all of the bit cells of the SRAM circuit are '1.'

Before the example processor 1000 applies a challenge to the SRAM array 204 of FIG. 1, the processor 1000 applies the initial parameters based on the data received by the receiver 1002 by writing values associated with the initial logic values to the bit cell(s) of the SRAM array 204. The processor 1000 sends initialization data to the example bit cell determiner 1004. The example bit cell determiner 1004, equipped with the initialization data, determines which bitline and wordline are associated with a bit cell(s) to be written. The bit cell determiner 1004 also determines which value to write to the bit cell(s). The bit cell determiner 1004 sends the bit cell information to the example voltage source 1006, the voltage source applies an appropriate voltage to the wordline and bitline associated with the bit cell(s) to write an initial logic pattern for the bit cell(s). The bit cell determiner 1004 repeats this process until all initial bit cell values have been written in the bit cells.

Once the initial logic pattern have been applied to the bit cells of the example SRAM array 204, the example processor 1000, of FIG. 10, instructs the example bit cell determiner 1004 to read the stored value of one or more bit cells depending on the challenge data from the data received from the example receiver 1002. The bit cell determiner 1004, equipped with the challenge data, determines which bitline(s) and wordline(s) are associated with the bit cell(s) to be read. The bit cell determiner 1004 sends instructions regarding the read operation to the voltage source 1006. The voltage source 1006 applies an appropriate voltage to the wordline and bitlines associated with the bit cell(s) to read the value(s) stored in the bit cell(s). The voltage source 1006 sends a signal to a sense amplifier enable line to enable the sense amplifiers of the SRAM array 204 to read the stored values of the bit cells. In this manner, the voltage source repeatedly enables the sense amplifiers in set increments until the sense amplifier reads the correct value that was previously written. A count of sense enables is correlated to a read access time of the bit cells.

The example counter 1008 is initiated by the voltage source 1006 when a read operation begins. The example counter 1008 tracks the count of sense enables used to determine that a bit cell has been read, as further described in FIGS. 13-15. The example counter 1008 may be implemented using hardware, software, and/or firmware. The example counter 1008 records a count associated with the read access time of bit cells in the SRAM array 204. The counter 1008 begins to count as soon as it receives the initiation signal from the bit cell determiner 1004. Once a sense amplifier triggers the correct output from a bit cell, the counter 1008 records the bit cell and the count. If the read access time(s) of multiple bit cells are being monitored, the counter 1008 will continue monitoring the counts until each bit cell has been read.

Once the example counter 1008 of FIG. 10 has recorded the count associated with read access time(s) of the monitored bit cell(s), the processor 1000 sends data relating to the count of the bit cell(s) to the example count comparator 1010. The example count comparator 1010 compares the counts of the monitored bit cells to create a response corresponding to PUF parameters set by the challenge data. The processor 1000 sends the PUF parameters to the count comparator 1010 to create an appropriate response. The count comparator 1010 may create a response by determining which monitored bit cell is the fastest/slowest, an order of the read access times of the bit cells, or any other comparison of the counts of the bit cells. The count comparator 1010 sends the response to the processor 1000. The processor 1000 aggregates the data to create PUF data and relays the PUF data to an example transmitter 1012. The example transmitter 1012 transmits the response, via wired or wireless communication, back to the example PUF generator 104, the example database 108, and/or the example authentication host 114. Alternatively, the example processor 1000 may use the PUF data to create a key. In this manner, a cryptographic hash function may be applied to the key creating a HMAC. The transmitter 712 transmits the HMAC to the example PUF generator 104, the example database 108, and/or the example authentication host 114.

Figure 11:
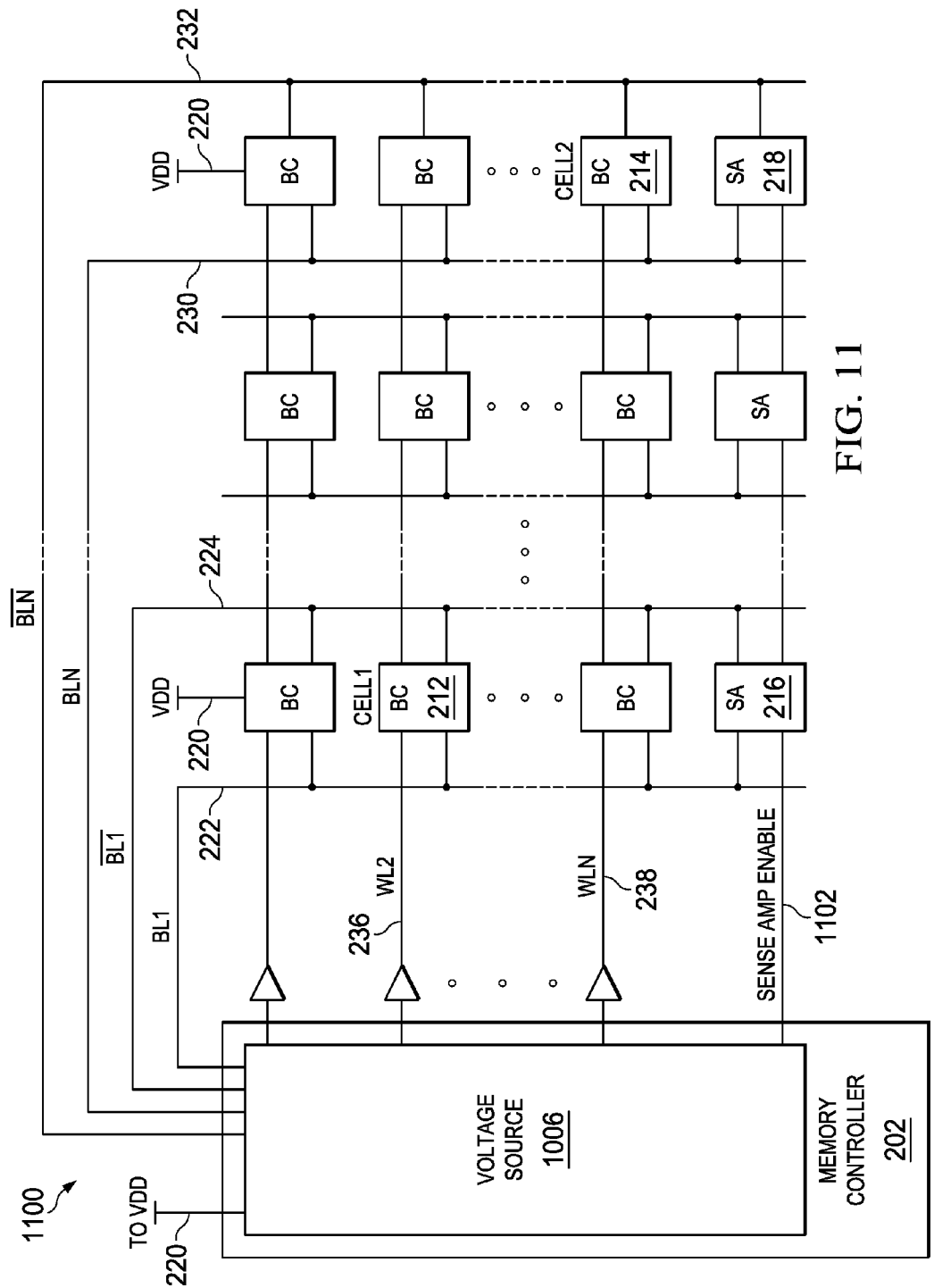
FIG. 11 is an example SRAM circuit to read bit cells in increments after applying a read signal to the bit cell to determine read access times of the bit cells to create a PUF.

FIG. 11 is an example SRAM circuit 1100 to compare the read access times of two or more bit cells 212, 214 at the same time to create a PUF. The example SRAM circuit 1100 comprises the example memory controller 202, the example bit cells 212, 214, the example sense amplifiers 216, 218, the example supply voltage VDD 220, the example bitlines 222, 230, the example complementary bitlines 224, 232 the example wordlines 236, 238 of FIG. 2. The example SRAM circuit 1100 further comprises the example voltage source 1006 of FIG. 10. The example SRAM circuit 1100 further comprises an example sense amplifier enable line 1102.

Before a challenge is applied to the example SRAM circuit 1100, bit cells of the SRAM circuit 1100 are first initialized to initial logic pattern as set by PUF parameters of the challenge. Although the illustrated example monitors and compares read access times of the example bit cell 1 212 and the example bit cell 2 214 to create PUF data, any number of bit cells may be monitored and compared. For example, PUF data can be generated based on an order of four bit cells of the SRAM circuit 1100.

Before a challenge (e.g., read access time measurement) begins, the memory controller pre-charges the example bitlines 222, 230 and the example complementary bitlines 224, 232 to a high voltage (e.g., equal to the supply voltage VDD 220 or half of the supply voltage VDD 220). At this time the example sense amplifiers 216, 218 see a small voltage differential between corresponding bitlines (e.g., bitline1 BL1 222 and complementary bitline BL1 224 or bitline BLN 230 and complementary bitline BLN 232) indicating that neither of the corresponding bitlines have been discharged, and therefore the corresponding bit cell has not been read. Additionally, a voltage applied to the supply voltage line VDD 220 may be lowered to, for example, a retention mode voltage. Lowering the supply voltage to the retention mode voltage slows down read access times of bit cells of an SRAM circuit 1100. Slowing down the read access times of the bit cells allows for an easier measurement and comparison of the read access times of the bit cells.

The memory controller applies a high voltage to wordlines 236, 238 of FIG. 11 to initiate a read sequence. In this manner, if a logic value of '1' is stored in the bit cell1 212, complementary bitline BL1 224 will be discharged in bit cell 1 212. Thus, bitline BL1 222 will have logic a value of '1' and complementary bitline BL1 224 will have a logic value of '0,' causing a large voltage differential between bitline BL1 222 and complementary bitline BL1 224. When a sense amplifier 216 is enabled, the sense amplifier 216 can detect the voltage differential signifying that bit cell1 212 has been read. Upon detecting the voltage differential, a signal may be sent to the memory controller 202 of FIG. 1 to indicate that bit cell1 212 has been read. If a '0' is stored in the bit cell1 212, the bitline BL1 222 and the complementary bitline1 BL1 224 will switch logic values (e.g., bitline BL1 222 will have a logic value of '0' and complementary bitline BL1 224 will have a logic value of '1'), but the determination that the bit cell 212 was read would be the same. Additionally, the read access time of bit cell2 214 can be monitored by sense amplifier 218 by measuring a voltage differential between the bitline BLN 230 and the complementary bitline BLN 232. Similarly, a signal may be sent to the memory controller 202 of FIG. 1 to indicate that bit cell2 214 has been read.

In some examples, the example voltage source 1006 is used to enable the sense amplifiers 216, 218 by sending an example enable signal though an example sense amplifier enable line 1102. In this manner, the voltage source 1006 can enable the sense amplifiers 216, 218 at various increments of time (e.g., various delays after the wordline is initiated), which are counted, via the example counter 1008 of FIG. 10, and used to compare read access times. Once enabled, the sense amplifier 216 measures the voltage differential between bitline BL1 222 and complementary bitline BL1 224, for example. If the sense amplifier output matches the value previously written to the bit cell, then the bit cell was read successfully. For example, the voltage source 1006 may enable the sense amplifiers 216, 218 five times before output of the sense amplifier 216 matches the initialized value of bit cell1 212, indicating a successful read. Additionally, the voltage source 1006 may enable the sense amplifiers 216, 218 eight times before the output of the sense amplifier 218 matches the initialized value of bit cell2 214, indicating that the bit cell2 214 has been read. The count of enables that it took to determine that a bit cell was read is sent to the memory controller 202 of FIG. 1 for further processing.

Figure 12:
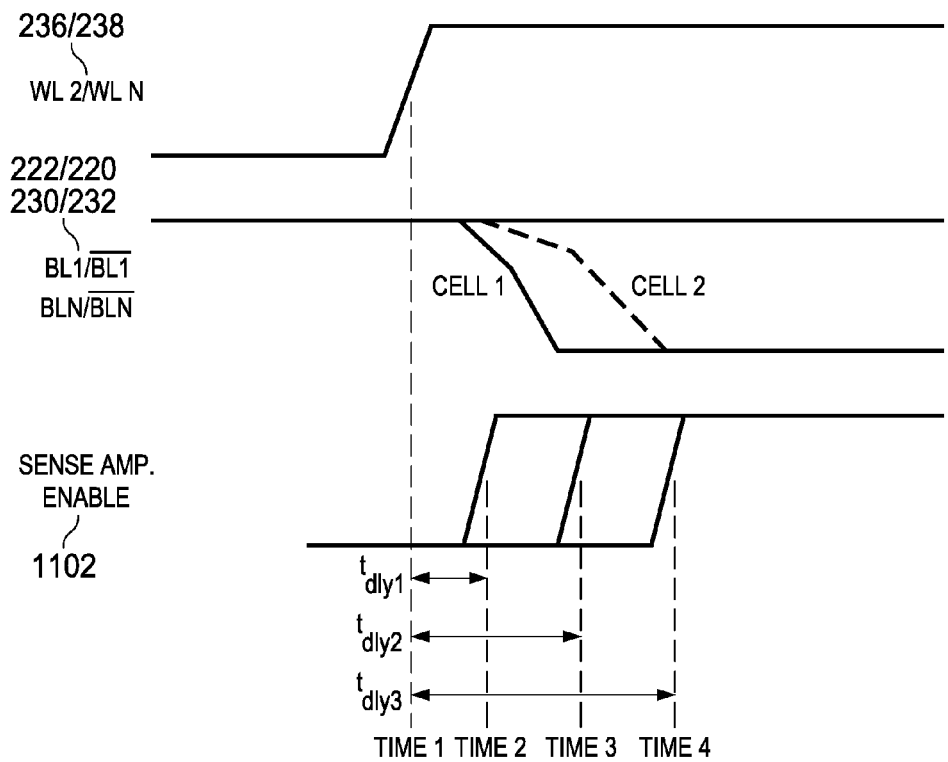
FIG. 12. is a graph displaying an example timing of example read access times of two bit cells for the example SRAM circuit of FIG. 11

FIG. 12 is a graph displaying an example timing of an example read access time for the circuit of FIG. 11. As explained above, at Time 1, bitlines 222, 224, 230, 232 are pre-charged to a high voltage. Applying a high voltage to wordlines 236, 238 at time 1 discharges either bitline BL1 222 or complementary bitline BL1 224 (e.g., depending on the stored value of bit cell1 212) lowering the voltage on the discharged line. Similarly, either bitline BLN 230 or complementary bitline BLN 232 (e.g., depending on the stored value of bit cell2 214) will discharge, lowering the voltage on the discharged line.

At time 2, the voltage source 1006 sends a signal on the sense amplifier enable line 1102 to enable the sense amplifiers 216, 218 to determine if either bit cell 212, 214 has been read. For example, at time 2, neither bit cell 1 212 nor bit cell 2 214 has been read, since the bitlines 222, 224 for bit cell 1 212 and the bitlines 230, 232, for bit cell 2 214 all remain at the high voltage. At time 3, the voltage source 1006 sends another signal on the sense amplifier enable line 1102 to enable the sense amplifiers 216, 218 to determine if the bit cells 212, 214 have been read. For example, at time 3, one of the bitlines 222, 224 of bit cell 1 212 has discharged. Thus, since the bitline BL1 222 and the complementary bitline1 BL1 224 have a large voltage differential, the sense amplifier 216 determines that the bit cell1 212 has been read. However, the bitline BLN 230 and the complementary bitline BLN 232 of bit cell 2 214 still have charged lines (e.g., high voltage). Thus, since bitline BLN 230 and complementary bitline BLN 232 have a small voltage differential at time 3, the sense amplifier 218 determines that the bit cell2 214 has not yet been read. The voltage source 1006 continues to repeat this process until all bit cells (e.g., in this example, bit cell 2 214) from a challenge have been read.

At Time 4, the voltage source 1006 sends an additional signal on the sense amplifier line 1102 to enable the sense amplifier 218 to determine if the bit cell2 214 has been read. At time 4, one of the bitlines 230, 232 of bit cell 2 214 has discharged. Thus, the bitline BLN 230 and the complementary bitline BLN 232 have a large voltage differential, therefore the sense amplifier 218 determines that the bit cell2 214 has been read. In this manner, a memory controller can determine that the example bit cell1 212 is faster than the example bit cell2 214, since the count of sense enables to read bit cell1 212 was two and the count of sense enables to read bit cell2 214 was three.

Figure 13:
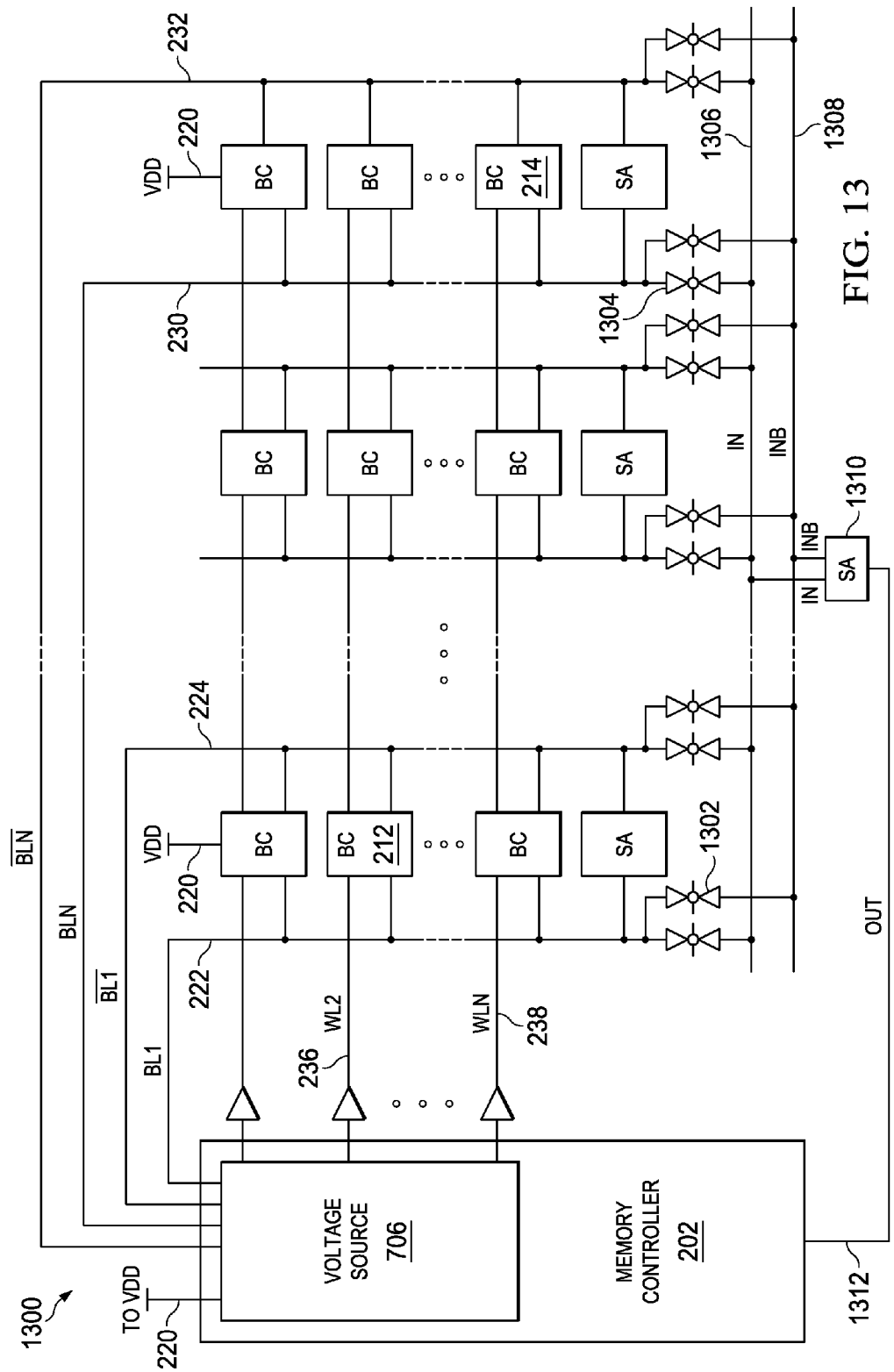
FIG. 13 is an example SRAM circuit to compare the read access times of two bit cells at the same time to create a PUF.

FIG. 13 is an example SRAM circuit 1300 to compare the read access times of two, or more, bit cells at the same time to create a PUF. The example SRAM circuit 1300 comprises the example memory controller 202, the example bit cells 212, 214, the example supply voltage VDD 220, the example bitlines 222, 224, 230, 232, and the example wordlines 236,238 of FIG. 2. The example SRAM circuit 1300 further comprises the voltage source 706 of FIG. 7. The example SRAM circuit 1300 further comprises example switches 1302, 1304, example input lines 1306, 1308, an example sense amplifier 1310, and an example output line 1312.

The example switches 1302, 1304 allow, or block, the voltage from the example bitlines 222, 224, 230, 232 from being input into the example sense amplifier 1310, via the input lines 1306, 1308. When a switch is enabled the voltage on a connected bitline is inputted to the sense amplifier 1310 via an input line connected to the switch. When a switch is disabled the voltage on a connected bitline is blocked from being input to the sense amplifier 1310 via an input line connected to the switch. The example input lines 1306, 1308 feed the voltage of the example bitlines 222, 230 and the example complementary bitlines 224,232 into the inputs of the example sense amplifier 1310 when the corresponding switch 1302, 1304 is enabled. The example sense amplifier 1310 outputs a logic value if there is a positive voltage differential between input 1306 and input B 1308 and outputs a different (e.g., opposite) logic value if there is a negative voltage differential between input 1306 and input B 1308. The logic value is output on output line 1312 and sent to the memory controller 202 to determine which bit cells read access time is faster based on the output.

Before a challenge is applied to the example SRAM circuit 1300, the bit cells are first initialized to an initial logic pattern as set by PUF parameters of the challenge. Although the illustrated example monitors and compares read access times of the bit cells 212, 214 to create PUF data, any number of bit cells may be monitored and compared. For example, PUF data can be generated based on an order of four bit cells of the example SRAM circuit 1300.

When a challenge (e.g., read access time measurement) begins, the memory controller turns on the example switches 1302, 1304 associated with the bitlines that will discharge through a read operation. Since the memory controller wrote the initial logic pattern prior to applying the challenge, the memory controller 202 will know which bitline will discharge for a given bit cell during the read operation. This knowledge allows for the memory controller to turn on all switches for bit cell lines that will discharge, and close all switches for bit cells that will not discharge. Prior to applying the read operation, the memory controller 202 pre-charged bitlines 222, 224, 230, 232 of FIG. 13 to a high voltage (e.g., equal to the supply voltage VDD 220 or half of the supply voltage VDD 220). In this manner, the high charge (e.g., logic value '1') is applied on the bitlines 222, 224, 230, 232. Since the example switches 1302, 1304 are on, the high charge will be applied to an example input line IN 1306 and an example input line B 1308, which feed into an example sense amplifier 1310. Additionally, a voltage applied to the supply voltage line VDD 220 may be lowered to, for example, a retention mode voltage. Lowering the supply voltage to the retention mode voltage slows down read access times of bit cells of an SRAM circuit 1300. Slowing down the read access times of the bit cells allows for an easier comparison of the read access times of the bit cells.

The memory controller 202 applies a high voltage to the wordline WL2 236 and the wordline WLN 238 of FIG. 13 to initiate a read sequence. In this example, both bit cells 212, 214 have been initiated to store a logic value of '0.' In this manner, the bitline BL1 222 and the bitline BLN 230 will be discharged in the bit cells 212, 214, respectively. The example complementary bitline BL1 224 and the example complementary bitline BLN 232 will remained charged. The discharging of the bitline BL1 222 and the bitline BLN 230 will change the logic value of '1' to a logic value of '0' for those bitlines. Therefore, since the example switches 1302, 1304 are on, the example input line IN 1306 and the example input line B 1308 will also change from the logic value of '1' to the logic value of '0.'

The example sense amplifier 1310 measures a voltage differential between the input line 1306 and the input line B 1308. In response to the change of the logic value on the input line 1306 or the input line B 1308, the example sense amplifier 1310, initially receiving logic value of '1' from both of the pre-charged input lines 1306, 1308, will output a logic value of '0' or '1' depending on which input lines 1306, 1308 discharged faster. The discharging of a bit cell is representative of the read access time for the bit cell. For example, if the example input 1306 discharges first, the example sense amplifier 1310 may output a logic value of '0.' Alternatively, if the example input B 1308 discharges first, the example sense amplifier 1310 may output a logic value of '1.' Conversely, the output logic values may be switched to represent which bit cell's read access time is fastest. The example output 1312 is relayed back to the memory controller 202 for further processing.

Figure 14:
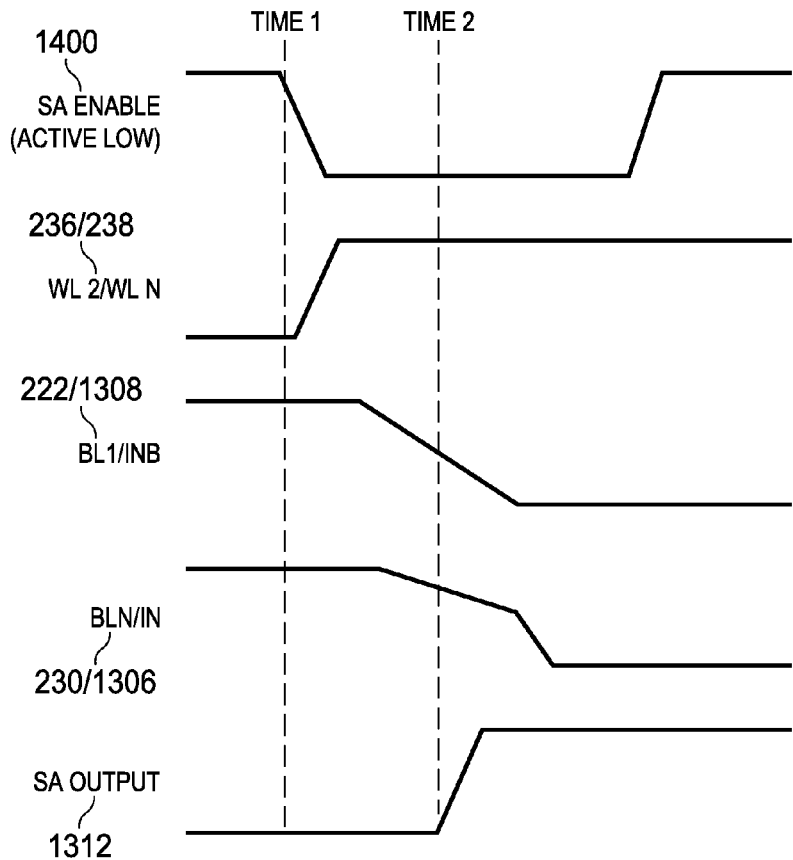
FIG. 14 is an example graph illustrating a comparison of example read access times of the SRAM circuit of FIG. 13

FIG. 14 is an example graph illustrating a comparison of example read access times of the SRAM circuit 1300 of FIG. 13. As explained above, before Time 1, the bitlines 222, 230 are pre-charged to a high voltage, thus the input lines 1306, 1308 to the sense amplifier 1310 are also high. Since both input lines 1306, 1308 are high the sense amplifier output 1312 is low. At Time 1, an example sense enable line 1400, which in this example is active low, is set low to enable the sense amplifier 1310. In order to initiate the read sequence, example wordline 2 236 and example wordline N 238 are set to a high voltage.

At time 2, both the example bitlines 222, 230 have begun to discharge at different rates, therefore the example inputs 1306, 1308 have also begun to discharge (e.g., since they are tied together). The example sense amplifier 1310 measures a voltage differential between the input 1306 and the input B 1308 that is large enough to trigger the sense amplifier 1310 to sense and thus determine which bit cell has discharged faster. In this example, since the input B 1308 discharged faster, the sense amplifier output 1312 outputs a logic value of '1.' Alternatively, if the input 1306 discharged faster, the sense amplifier output 1312 would output a logic value of '0.' The sense amplifier output 1312 is sent to the memory controller 202 for further processing.

While example manners of implementing the example memory controller 202 of FIG. 2 are illustrated in FIGS. 7 and 10, elements, processes and/or devices illustrated in FIGS. 7 and 10 may be combined, divided, re-arranged, omitted, eliminated and/or implemented in any other way. Further, the example processor 700, the example receiver 702, the example bit cell determiner 704, the example voltage source 706, the example timer 708, the example time comparator 710, the example transmitter 712 and/or, more generally, the example memory controller 202 of FIG. 7, the example processor 1000, the example receiver 1002, the example bit cell determiner 1004, the example voltage source 1006, the example counter 1008, the example count comparator 1010, the example transmitter 1012, and/or, more generally, the example memory controller 202 of FIG. 10 may be implemented by hardware, machine readable instructions, software, firmware and/or any combination of hardware, machine readable instructions, software and/or firmware. Thus, for example, any of the example processor 700, the example receiver 702, the example bit cell determiner 704, the example voltage source 706, the example timer 708, the example time comparator 710, the example transmitter 712, and/or, more generally, the example memory controller 202 of FIG. 7, the example processor 1000, the example receiver 1002, the example bit cell determiner 1004, the example voltage source 1006, the example counter 1008, the example count comparator 1010, the example transmitter 1012, and/or, more generally, the example memory controller 202 of FIG. 10 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one the example processor 700, the example receiver 702, the example bit cell determiner 704, the example voltage source 706, the example timer 708, the example time comparator 710, the example transmitter 712, and/or, more generally, the example memory controller 202 of FIG. 7, the example processor 1000, the example receiver 1002, the example bit cell determiner 1004, the example voltage source 1006, the example counter 1008, the example count comparator 1010, the example transmitter 1012, and/or, more generally, the example memory controller 202 of FIG. 10 is/are hereby expressly defined to include a tangible computer readable storage device or storage disk such as a memory, a digital versatile disk (DVD), a compact disk (CD), a Blu-ray disk, etc. storing the software and/or firmware. Further still, the example memory controller 202 of FIGS. 7 and 10 include elements, processes and/or devices in addition to, or instead of, those illustrated in FIGS. 15-18, and/or may include more than one of any or all of the illustrated elements, processes and devices.

Flowcharts representative of example machine readable instructions for implementing the memory controller 202 of FIGS. 7 and 10 are shown in FIG. 15-18. In the examples, the machine readable instructions comprise a program for execution by a processor such as the processor 2012 shown in the example processor platform 2000 discussed below in connection with FIG. 20. In the examples, the machine readable instructions comprise a program for execution by a processor such as the processor 2112 shown in the example processor platform 2100 discussed below in connection with FIG. 21. The program may be embodied in machine readable instructions stored on a tangible computer readable storage medium such as a CD-ROM, a floppy disk, a hard drive, a digital versatile disk (DVD), a Blu-ray disk, or a memory associated with the processor 2012 or 2112, but the entire program and/or parts thereof could alternatively be executed by a device other than the processor 2012 or 2112 and/or embodied in firmware or dedicated hardware. Further, although the example program is described with reference to the flowcharts illustrated in FIGS. 15-18, many other methods of implementing the example memory controller 202 of FIGS. 7 and 10 may alternatively be used. For example, the order of execution of the blocks may be changed, and/or some of the blocks described may be changed, eliminated, or combined.

As mentioned above, the example processes of FIGS. 15-18 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 15-18 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 15:
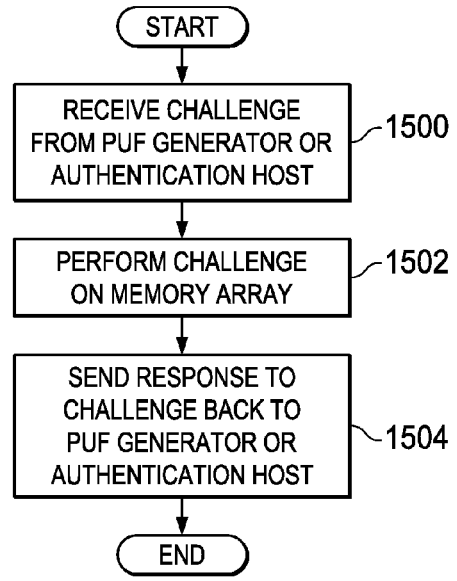
FIG. 15 is a flowchart representative of example machine readable instructions that may be executed to implement the example memory controllers of FIGS. 7 and 10 to create a PUF and/or authenticate an IC.

The example machine readable instructions illustrated in FIG. 15 may be executed to cause the memory controller 202 of FIGS. 7 and/or 10 to create and/or authenticate a PUF. Although the flowchart of FIG. 15 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 15 is a flowchart representative of example machine readable instructions that may be executed to implement the example memory controllers of FIGS. 7 and 10 to create and/or authenticate a PUF. The instructions could be sent from the example PUF generator 104, the example authentication host 114, and/or the example database 108. For example, instructions may be sent by the PUF generator 104 when the SRAM chip 102 is fabricated or when it has been determined that challenges currently stored in the database have been applied to the SRAM array and more challenge-response pairs are needed to increase the size of the PUF data in the database 108. Alternatively, the instructions may be sent by the authentication host 114 to verify the response to a response stored in the example database 108. In some examples, the instructions may be created internally by example processor 700, 1000 of the example memory controller 202.

At block 1500, the memory controller 202 receives a challenge, via the example receiver 702, 1002 from the example PUF generator 104, the example authentication host 114, and/or the example database 108. The challenge may contain any number of bit cells whose read access times should be measured and/or compared, an initial logic pattern, supply voltage level, and PUF parameters regarding the response PUF data to be sent back to the example PUF generator 104, the example authentication host 114, and/or the example database 108 (e.g., which bit cell is the fastest, which bit cell is the slowest, and order of the bit cells, a key based on the PUF data, etc.).

At block 1502, the memory controller 202 performs the challenge on an SRAM circuit given the PUF parameters set by the challenge. The response to the challenge may be determined using any example method based on the example SRAM circuits 800 of FIG. 8, 1100 of FIG. 11, and/or 1300 of FIG. 13. For example, the read access times of the bit cells may be measured individually and compared by the time comparator 710 and/or count comparator 1010 in conjunction with FIG. 10. Alternatively, the read access times of bit cells may be compared directly to determine a count of sense amplifier enables used to determine when the bit cells were read, in conjunction with FIG. 11. Alternatively, the read access times of two or more bit cells may be compared directly to determine an ordering based on the read access times of the bit cells, in conjunction with FIG. 13.

At block 1504, the example transmitter 712, 1012 sends the PUF response and/or key as determined by the processor 700, 1000 to the example PUF generator 104, the example authentication host 114, and/or the example database 108. In some examples, the PUF response, key, and/or any other data can be sent to the example PUF generator 104 and/or the example database 108 to be stored for later authentication. In some examples, the authentication host 114 can compare the response and/or key to PUF data stored in a database to determine if the SRAM chip 102 is valid or not. Additionally, the authentication host 114 may send a signal back to the SRAM chip 102 based on the comparison of the PUF data to the response. For example, if the PUF data matches the response, a signal may be sent to the SRAM chip 102 verifying that a product containing the SRAM chip 102 can be utilized. If the PUF data does not match the response, a signal may be sent to disable and/or erase any data on the SRAM chip 102 or disable and/or erase any data on another circuit in the product containing the SRAM chip 102.

Figure 16:
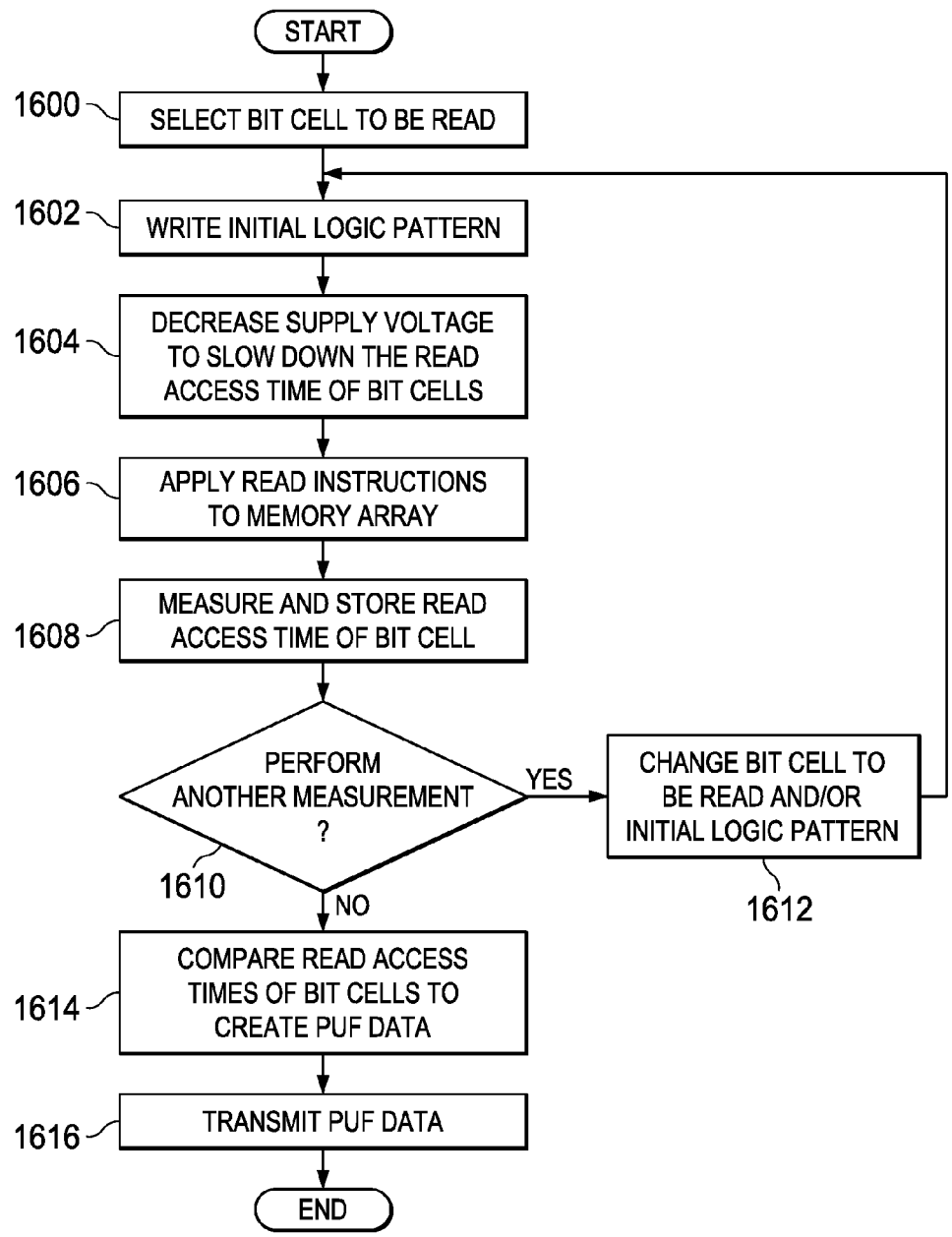
FIG. 16 is a flowchart representative of example machine readable instructions that may be executed to implement the example memory controller of FIG. 7 to create a PUF based on a time comparison of two bit cells.

The example machine readable instructions illustrated in FIG. 16 may be executed to cause the memory controller 202 of FIGS. 2 and 7 to create a PUF described in conjunction with FIG. 8. Although the flowchart of FIG. 16 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 16 is a flowchart representative of example machine readable instructions that may be executed to implement the example memory controller of FIG. 7 to create PUF data based on read access times of bit cells in conjunction with the SRAM circuit 800 of FIG. 8. The method of FIG. 16 begins when the example receiver 702 of FIG. 7 receives instructions to create PUF data and/or authenticate the PUF data. The instructions could be sent from a database (e.g., database 108 of FIG. 1) when an SRAM circuit is produced (e.g., during the enrollment stage) or when it has been determined that the unique challenges stored in the database have been exhausted and more challenge-response pairs are needed to increase the size of the PUF data in the database 108. In this manner, the processor 700 may create new challenge-response pairs to be securely communicated and stored in the database 108 to prevent the authentication host 114 from applying a challenge that has already been applied. Alternatively, the instructions may be created by processor 700 of the memory controller 202.

At block 1600, the example processor 700 selects a bit cell to be read in conjunction with a challenge. Once the bit cell is selected, the example processor 700 sends selected bit cell data to an example bit cell determiner 704 to determine row and column lines associated with the bit cell. Since a different initial logic pattern in an SRAM circuit effect the read access times of the bit cells, the initial logic pattern may be used as part of the PUF data used to identify the SRAM circuit 800. Therefore, the example voltage source 706 applies the appropriate voltages to write a first initial logic pattern and the initial logic pattern may be used as a PUF parameter of the challenge to create the PUF data (block 1602).

At block 1604, the processor 700 may instruct the example voltage source 706 to decrease a supply voltage of the SRAM circuit 800 to slow down the read access time of the selected bit cell. Slowing down the read access time creates a more accurate comparison of bit cells. For example, a comparison of two bit cells that are measured at a full supply voltage may result in a 10 nanosecond difference, whereas the comparison of the two bit cells when measured at a decreased supply voltage may result in a 30 nanosecond difference. This is especially important when comparing multiple bit cells.

At block 1606, the voltage source 706 applies read voltage instructions to bitlines and a wordline associated with the selected bit cell. The bit cell determiner 704 initiates the example timer 708 of FIG. 7, to determine the read access time associated with the selected bit cell.

At block 1608, the processor 700 measures and stores the read access time of the bit cell determined from the example timer 708. As explained in FIGS. 8 and 9, the read access time of a bit cell is measured based on a duration of time from when the read instructions are applied to when the example XOR gate 812 outputs a logic value of '1.' Once measured, the time is sent to the time comparator 710 to later compare the time of two or more bit cells of the SRAM circuit 800. Alternatively, the timer 708 may include a time-to-digital converter in to convert the time to a digital format.

At block 1610, the processor 700 determines if another measurement is to be performed (e.g. measurement of a read access time of a different bit, measurement of the read access time of the same bit with a different initial logic pattern, and/or to verify a previous PUF response). The number of measurements to be performed may be determined based on PUF parameters or an ideal size of PUF data to be sent to a database 108. If the processor 700 determines that another measurement is to be performed, the processor 700 changes the bit cell to be read and/or the initial logic pattern to be written to the bit cells prior to reading the bit cell (block 1612). Once the bit cell and/or initial logic pattern has been changed the process returns to block 1602 to apply a new challenged based on the new parameters. Alternatively, the challenge may be repeated with the same PUF parameters to verify the PUF response.

If the processor 700 determines that another measurement is not to be performed, the processor 700 instructs the time comparator 710 to compare the values associated with the read access times of the bit cells to create PUF data (block 1614). Based on the PUF parameters of the challenge, the processor 700 may determine a comparison of the read access times of two or more bit cells. For example, the PUF parameters for a challenge may consist of a comparison of a bit cell at the fifth row and sixth column and a bit cell at the first row and the seventh column. Once the time comparator 710 compares the read access times of the bit cells, the processor 700 aggregates the data to create PUF data. The PUF data may include the initial pattern value of all bit cells (e.g. writing logic value '1' for certain bit cells and writing logic value '0' for other bit cells), the read access time associated with the bit cells, which bit cell is fastest/slowest, an order of the read access times (e.g., if more than 2 bit cells are being compared), and/or any other data related to the read access times of the bit cells. Alternatively, the PUF data may be used to create a unique key representing the SRAM circuit 800.

The processor 700 creates PUF data by determining an order of the bit cells by comparing the read access times of the bit cells. For example, if the read access times of two bit cells were determined, the processor 700 may determine which bit cell is faster by taking a difference of the two read access times. In this manner, a sign of the difference determines which bit cell is faster (e.g., if the difference is positive, the first bit cell is faster and if the difference is negative, the first bit cell is slower). Alternatively, a PUF response can be determined based on how much faster/slower a bit cell is to another bit cell. In this manner, the PUF data may be how much faster/slower one bit cell is to another (e.g., example bit cell 1 is 57 nanoseconds faster than example bit cell 2). At block 1616, the example transmitter 712 transmits the PUF data and/or the unique key to the example PUF generator 104, the example authentication host 114, and/or the example database 108. In this example, for a two bit comparison there are $4X(X-1)/2$ distinct challenges possible, where X is the number of bit cells in the SRAM circuit 800. For a N bit cell comparison, $2^N X!/(N!(X-N)!)$ distinct challenges per initial logic pattern. Due to the large volume of distinct challenges, the processor 700 may only commute part of the challenge-response pairs and send more challenge-response pairs as needed. Alternatively, the transmitter 712 may transmit all or part of the data and/or key associated with the challenge and the response to the database 108, where the database 108 may aggregate the read access times to create the PUF data.

Figure 17:
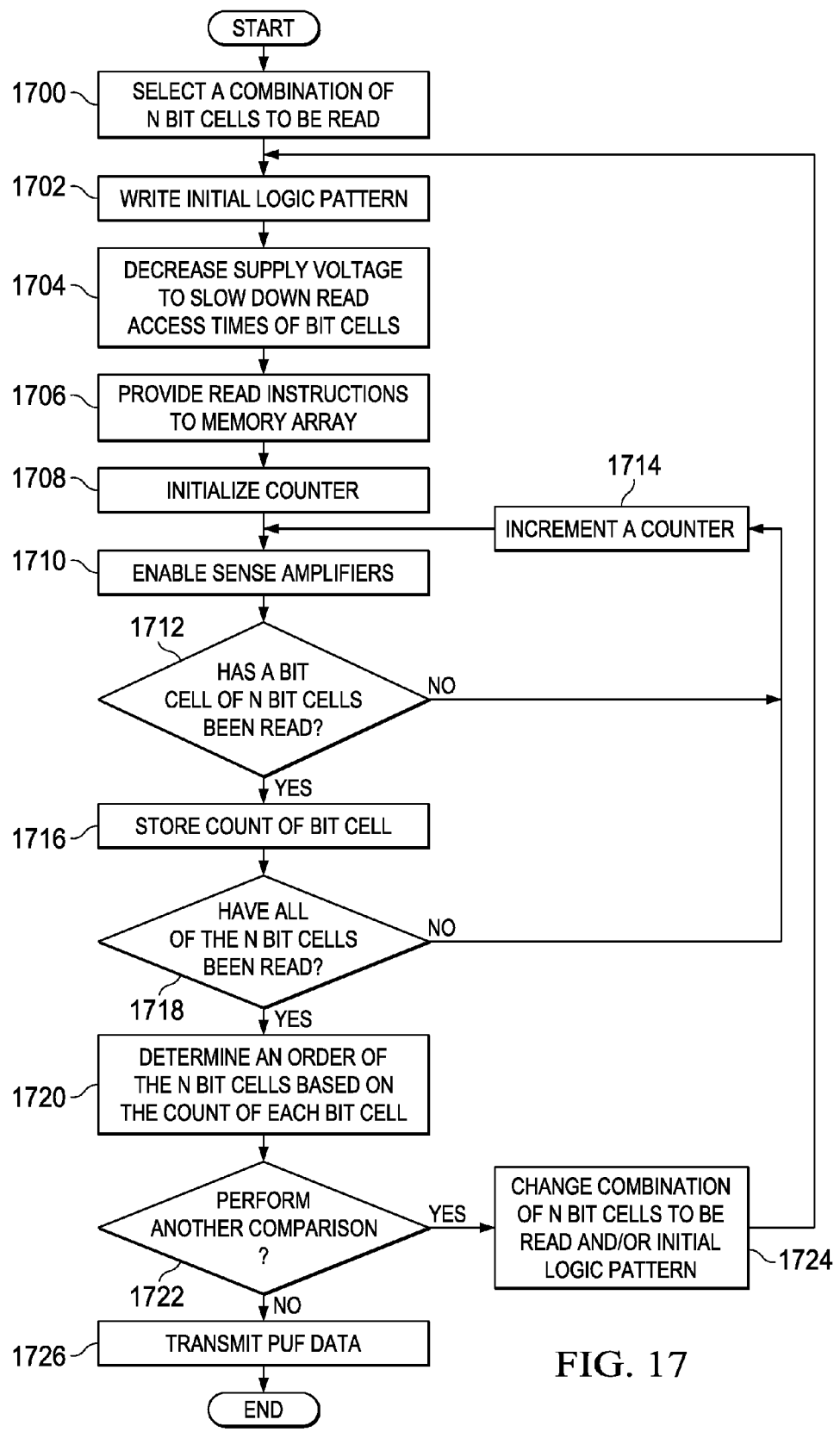
FIG. 17 is a flowchart representative of example machine readable instructions that may be executed to implement the example memory controller of FIG. 10 to create a PUF based on a time comparison of N bit cells.

The example machine readable instructions illustrated in FIG. 17 may be executed to cause the memory controller 202 of FIGS. 2 and 10 to create a PUF described in conjunction with FIG. 11. Although the flowchart of FIG. 17 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 17 is a flowchart representative of example machine readable instructions that may be executed to implement the example memory controller 202 of FIGS. 2 and 10 to create a PUF based on a count comparison of N bit cells. The method of FIG. 17 begins when the receiver 1002 of FIG. 10 receives instructions to create PUF data. The instructions could be sent from a database (e.g., database 108 of FIG. 1) when an SRAM circuit is produced (e.g., during the enrollment stage) or when it has been determined that the challenges stored in the database have been exhausted and more challenge-response pairs are needed to increase the size of the PUF data in the database 108. In this manner, the processor 1000 may create new challenge-response pairs to be sent securely and stored in the example database 108 to prevent the authentication host from applying a challenge that has already been applied. Alternatively, the instructions may be created by processor 1000 of the memory controller 202.

At block 1700, the example processor 1000 selects N bit cells to be read in conjunction with a challenge. Once the N bit cells are selected, the example processor 1000 sends the selected N bit cell's data to an example bit cell determiner 1004 to determine row and column lines associated with the bit cells. Since a different initial logic pattern in an SRAM circuit 1100 affect the read access times of the N bit cells, the initial logic pattern may be used as part of the PUF data used to identify the example SRAM chip 102. Therefore, the example voltage source 1006 applies the appropriate voltages to write a first initial logic pattern and the initial logic pattern may be used as part of the challenge to create the PUF data (block 1602).

At block 1704, the processor 1000 may instruct the example voltage source 1006 to decrease a supply voltage of the SRAM circuit 1100 to slow down the read access times of the selected N bit cells. Slowing down the read access times creates a more accurate comparison of bit cells. For example, a comparison of two bit cells that are measured at a full supply voltage may result in a 10 nanosecond difference, whereas the comparison of the two bit cells when measured at a decreased supply voltage may result in a 30 nanosecond difference. This is especially important when comparing multiple bit cells.

At block 1706, the voltage source 1006 applies read instructions to bitlines and a wordline associated with the selected N bit cells. At block 1706 the processor 1000 initializes the counter 1008 of FIG. 10. The counter is set to increment a count after sense amplifiers are enabled. Alternatively, the counter may be set to count a number of clock cycles of the processor 1000.

At block 1710, the voltage source 1006 enables the sense amplifiers. The sense amplifiers determine whether any of the N bit cells have been read based on whether the correct value appears at the output of the sense amplifier, as described in FIGS. 11 and 12. Equipped with data from the sense amplifiers via the bit cell determiner 1004, the processor 10 determines if any of the N bit cells has been read (block 1712). If a bit cell has not been read, the counter 1008 is incremented (block 1714) and the sense amplifiers are enabled again. If one of the N bit cells has been read, the processor 1000 sends the count associated with the read bit cell to the count comparator 1010 (block 1716). The count is representative of the read access time of the read bit cell.

At block 1718, the processor 1000 determines if all of the N bit cells have been read. If all of the N bit cells have not been read, then the counter 1008 is incremented (block 1714) and the N bit cells that have not been read continue to be monitored until a count has been determined for all of the N bit cells. If all of the N bit cells have been read, the processor 1000 ends the monitoring process, and a comparison of the read access times can be determined.

At block 1720, the count comparator 1010 determines an order of the N bit cells based on the count of each bit cell. The processor 1000 determines whether to perform another comparison (e.g. measurement of a read access time of a different bit, measurement of the read access time of the same bit with a different initial logic pattern, and/or to verify a previous PUF response) (block 1722). If more PUF data is desired, the processor 1000 may change the combination of N bit cells to be read and/or the initial logic pattern for all the bit cells of the SRAM circuit 1100 (block 1724). Alternatively, the processor 1000 may repeat the challenge with the same PUF parameters to verify the result of the previous challenge.

If the processor 1000 determines that no more PUF data is desired, the example transmitter 1012 transmits the PUF data and/or the unique key to the example PUF generator 104, the example authentication host 114, and/or the example database 108 (block 1726). The PUF data may include the initial pattern value of all bit cells (e.g. writing logic value '1' for certain bit cells and writing logic value '0' for other bit cells), the read access time and/or count associated with the read access time, which bit cell is fastest/slowest, an order of the read access times, and/or any other data related to the read access times of the bit cells. In this example, for a two bit comparison there are 4X(X−1)/2 distinct challenges possible, where X is the number of bit cells in the SRAM circuit 1100. For a N bit cell comparison, $2^N X!/(N!(X-N)!)$ distinct challenges. Due to the large volume of distinct challenges, the processor 1000 may only commute part of the challenge-response pairs and send more challenge-response pairs as needed. Alternatively, the transmitter 1012 may transmit all, or part of, the data and/or key associated with the challenge and the response to the database, where the database may aggregate the read access times to create the PUF data.

Figure 18:
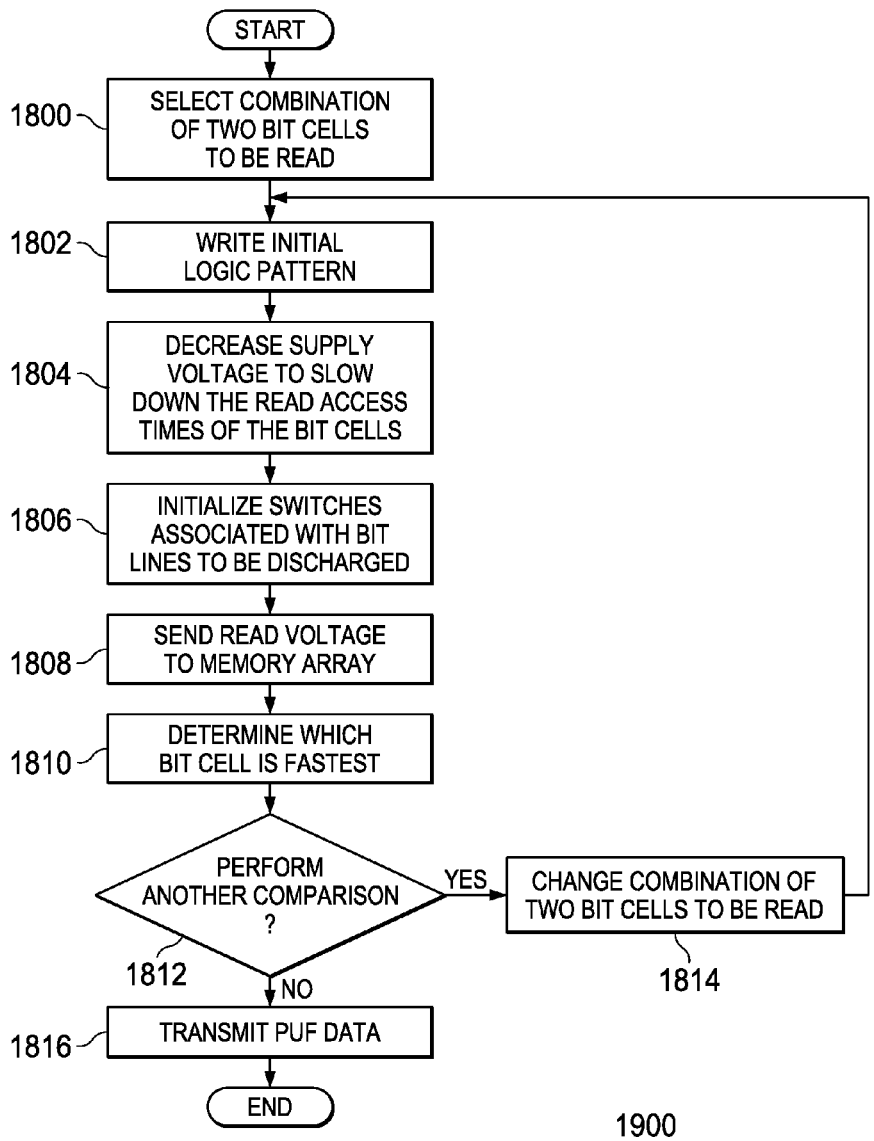
FIG. 18 is a flowchart representative of example machine readable instructions that may be executed to implement the example memory controller of FIGS. 7 and/or 10 to create a PUF based on a count comparison of N bit cells.

The example machine readable instructions illustrated in FIG. 18 may be executed to cause the memory controller 202 of FIGS. 2, 7, and/or 10 to create a PUF described in conjunction with FIG. 13. Although the flowchart of FIG. 18 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 18 is a flowchart representative of example machine readable instructions that may be executed to implement the example memory controller of FIGS. 7 and/or 10 to create PUF data based on read access times of bit cells in conjunction with the SRAM circuit 1300 of FIG. 13. The method of FIG. 16 begins when the receiver 702, 1002 receives instructions to create and/or authenticate PUF data. The instructions could be sent from a database (e.g., database 108 of FIG. 1) when an SRAM circuit is produced (e.g., during the enrollment stage) or when it has been determined that the unique challenges in the database have been exhausted and more challenge-response pairs are needed to increase the size of the PUF data in the database 108. In this manner, the processor 700, 1000 may create new challenge-response pairs to be stored in the database 108 to prevent the authentication host from applying a challenge that has already been applied. Alternatively, the instructions may be created by processor 700, 1000 of the memory controller 202.

At block 1800, the example processor 700, 1000 selects a combination of two bit cells to be read in conjunction with a PUF challenge. Once the two bit cells are selected, the example processor 700, 1000 sends selected bit cell data to an example bit cell determiner 704, 1004 to determine row and column lines associated with the bit cell. Since a different initial logic pattern of bit cells in an SRAM circuit 1300 affect the read access times of the bit cells, the initial logic pattern may be used as part of the PUF data used to identify the SRAM circuit 1300. Therefore, the example voltage source 706, 1006 applies the appropriate voltages to write a first initial logic pattern and the initial logic pattern may be used as part of the challenge to create the PUF data (block 1602).

At block 1804, the processor 700, 1000 may instruct the voltage source 706, 1006 to decrease a supply voltage of the SRAM circuit 1300 to slow down the read access time of the selected bit cell. Slowing down the read access time creates a more accurate comparison of bit cells. For example, a comparison of two bit cells that are measured at a full supply voltage may result in a 10 nanosecond difference, whereas the comparison of the two bit cells when measured at a decreased supply voltage may result in a 30 nanosecond difference. This is especially important when comparing multiple bit cells. At block 1806, the bit cell determiner 704, 1004 enables switches associated with the bitlines of the two bit cells that will be discharged by a read operation. Enabling the two switches allows for the example sense amplifier 1310 to determine which of the two bit cells discharges faster as described in FIG. 13.

After the switches are initialized, the voltage source 706, 1006 applies read voltage instructions to bitlines (e.g., to pre-charge the bitlines) and wordlines associated with the selected bit cells (e.g., to initialize the read sequence) (block 1808). At block 1810, after the bit cells have been discharged into example the sense amplifier 1310, the processor 700, 1000 determines which bit cell discharged fastest (e.g., had a fast read access time) based on the sense amplifier output 1330.

At block 1812, the processor 700, 1000 determines if another measurement is to be performed (e.g. measurement of a read access time of different bits, measurement of the read access time of the same bits with a different initial logic pattern, and/or to verify a previous PUF response). The number of measurements to be performed may be determined based on PUF parameters or an ideal size of PUF data to be sent to a database 108. If the processor 700, 1000 determines that another measurement is to be performed, the processor 700, 1000 changes the combination of two bit cells to be read and/or the initial logic pattern to be written to the bit cells prior to comparing the read access times of the two bit cells (block 1814). Once the combination of two bit cells and/or initial logic pattern has been changed the process returns to block 1802 to apply a new challenged based on the new parameters. Alternatively, the processor 700, 1000 may repeat the challenge with the same PUF parameters to verify the result of the previous challenge.

If the processor 700, 1000 determines that another comparison is not to be performed, the processor 700, 1000 aggregates data from the comparison(s) to create PUF data and/or a unique key based on the PUF data. The PUF data may include the initial logic pattern of all bit cells (e.g. writing logic value '1' for certain bit cells and writing logic value '0' for other bit cells), which bit cell is fastest/slowest, an order of the read access times (e.g., if more than 2 bit cells are being compared), and/or any other data related to the read access times of the bit cells.

At block 1816, the example transmitter 712, 1012 transmits the PUF data and/or the unique key to the example PUF generator 104, the example authentication host 114, and/or the example database 108. In this example, for a two bit comparison there are 4X(X−1)/2 distinct challenges possible per initial logic pattern, where X is the number of bit cells in the SRAM circuit 1300. Due to the large volume of distinct challenges, the processor 700, 1000 may only commute part of the challenge-response pairs and send more challenge-response pairs as needed. Alternatively, the transmitter 712, 1012 may transmit all or part of the data associated with the challenge and the response to the database, where the database may aggregate the read access times to create the PUF data. Although the example method compares two bit cells, additional hardware may be implemented to compare the read access times of any number of bit cells. In this manner, the PUF response may be based on which bit cell was fastest, slowest, and/or an order of the bit cells read access times. In this manner, a N bit cell comparison, $2^N X!/(N!(X-N)!)$ distinct challenges per initial logic pattern.

Figure 19:
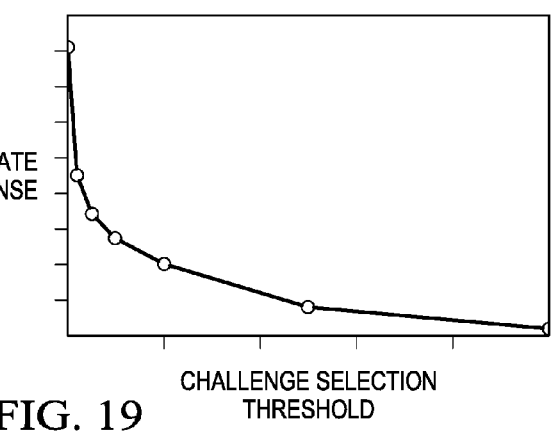
FIG. 19 is an example graph illustrating the effect of the authentication host or PUF generator selecting specific challenges.

FIG. 19 is an example graph 1900 illustrating the effect of the authentication host or PUF generator selecting specific challenges. The example graph 1900 contains information regarding an example bit error rate, i.e. fraction of bits that differ between PUF data measured during the PUF generation process and the PUF data measured again during use of the PUF in an application. The example graph 1900 also contains information on example challenge selection threshold 1904. The challenge selection threshold refers to a threshold by which the authentication host selects challenges to issue to a PUF. The threshold is the minimum difference in the read access time or count associated with bit cells selected in a challenge. As displayed below increasing the challenge selection threshold decreases the bit error rate.

Since there may be some error in measurement of SRAM bit cells that are have similar read access times, the authentication host can make more robust challenges by selecting two bit cells whose read access times differ by a threshold amount of time (e.g., more than 50 units). In this manner, there is less need for error correction or tolerance from the authentication host while authenticating the PUF.

Figure 20:
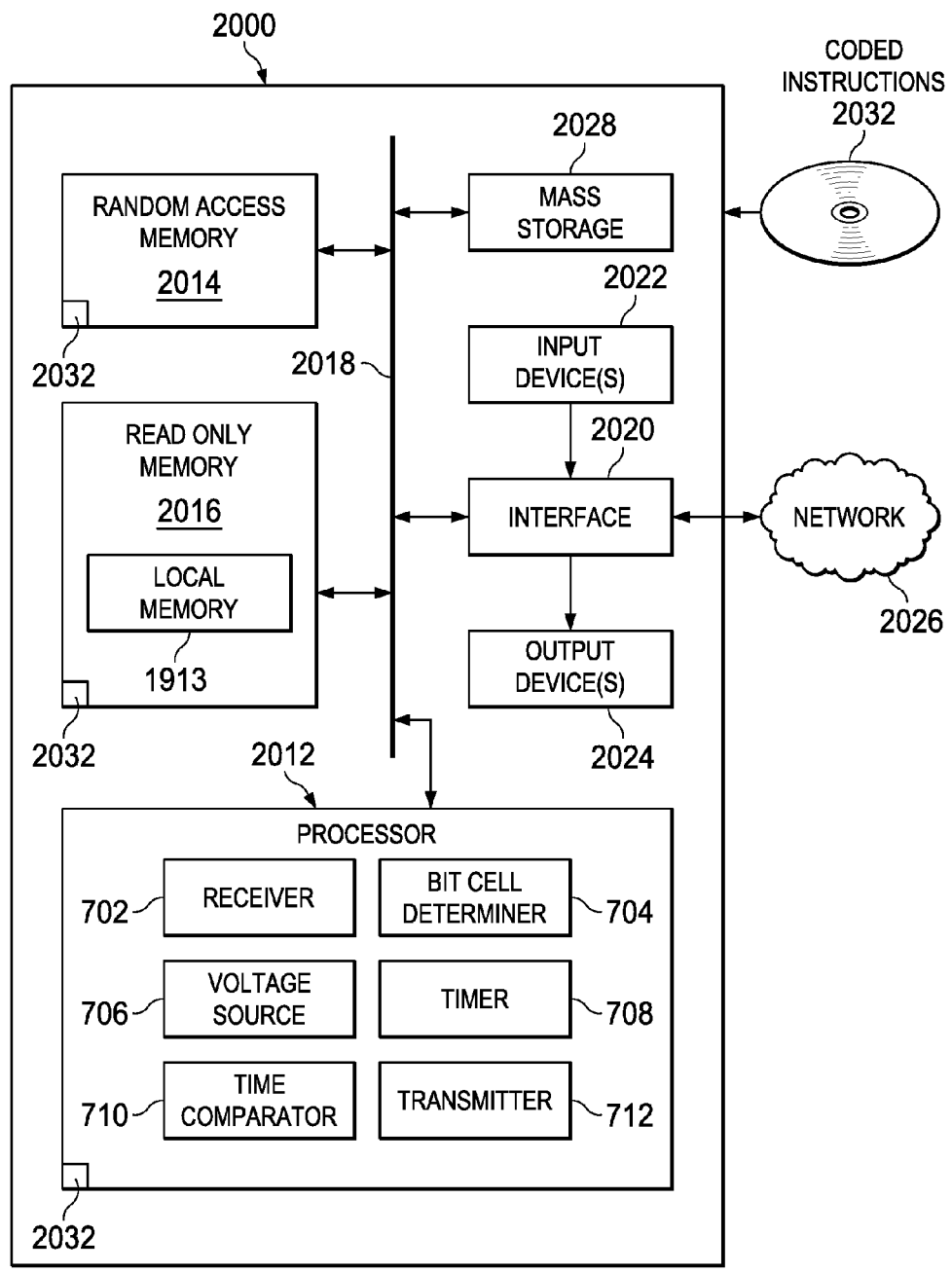
FIG. 20 is a block diagram of an example processor platform structured to execute the example machine readable instructions of FIGS. 15-18 to create a PUF and/or authenticate an integrated circuit (IC).

FIG. 20 is a block diagram of an example processor platform 2000 capable of executing the instructions of FIGS. 15-18 to implement the example memory controller 202 of FIG. 1. The processor platform 2000 can be, for example, a server, a personal computer, a mobile device (e.g., a cell phone, a smart phone, a tablet such as an iPad™), a personal digital assistant (PDA), an Internet appliance, or any other type of computing device.

The processor platform 2000 of the illustrated example includes a processor 2012. The processor 2012 of the illustrated example is hardware. For example, the processor 2012 can be implemented by integrated circuits, logic circuits, microprocessors or controllers from any desired family or manufacturer.

The processor 2012 of the illustrated example includes a local memory 2013 (e.g., a cache). The example processor 2012 of FIG. 20 executes the instructions of FIGS. 15-18 to implement the example receiver 702, the example bit cell determiner 704, the example voltage source 706, the example timer 708, the example time comparator 710, and the example time comparator 710 of FIG. 7 to implement the example memory controller 202. The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2012. The interface circuit 2012 may be implemented by any type of interface standard, such as an Ethernet interface, a universal serial bus (USB), and/or a PCI express interface.

In the illustrated example, one or more input devices 2022 are connected to the interface circuit 2012. The input device(s) 2022 permit(s) a user to enter data and commands into the processor 2012. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 2024 are also connected to the interface circuit 2012 of the illustrated example. The output devices 2024 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 2012 of the illustrated example, thus, typically includes a graphics driver card, a graphics driver circuit or a graphics driver processor.

The interface circuit 2012 of the illustrated example also includes a communication device such as a transmitter, a receiver, a transceiver, a modem and/or network interface card to facilitate exchange of data with external machines (e.g., computing devices of any kind) via a network 2026 (e.g., an Ethernet connection, a digital subscriber line (DSL), a telephone line, coaxial cable, a cellular telephone system, etc.).

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and digital versatile disk (DVD) drives.

The coded instructions 2032 of FIGS. 15-18 may be stored in the mass storage device 2028, in the volatile memory 2014, in the non-volatile memory 2016, and/or on a removable tangible computer readable storage medium such as a CD or DVD.

Figure 21:
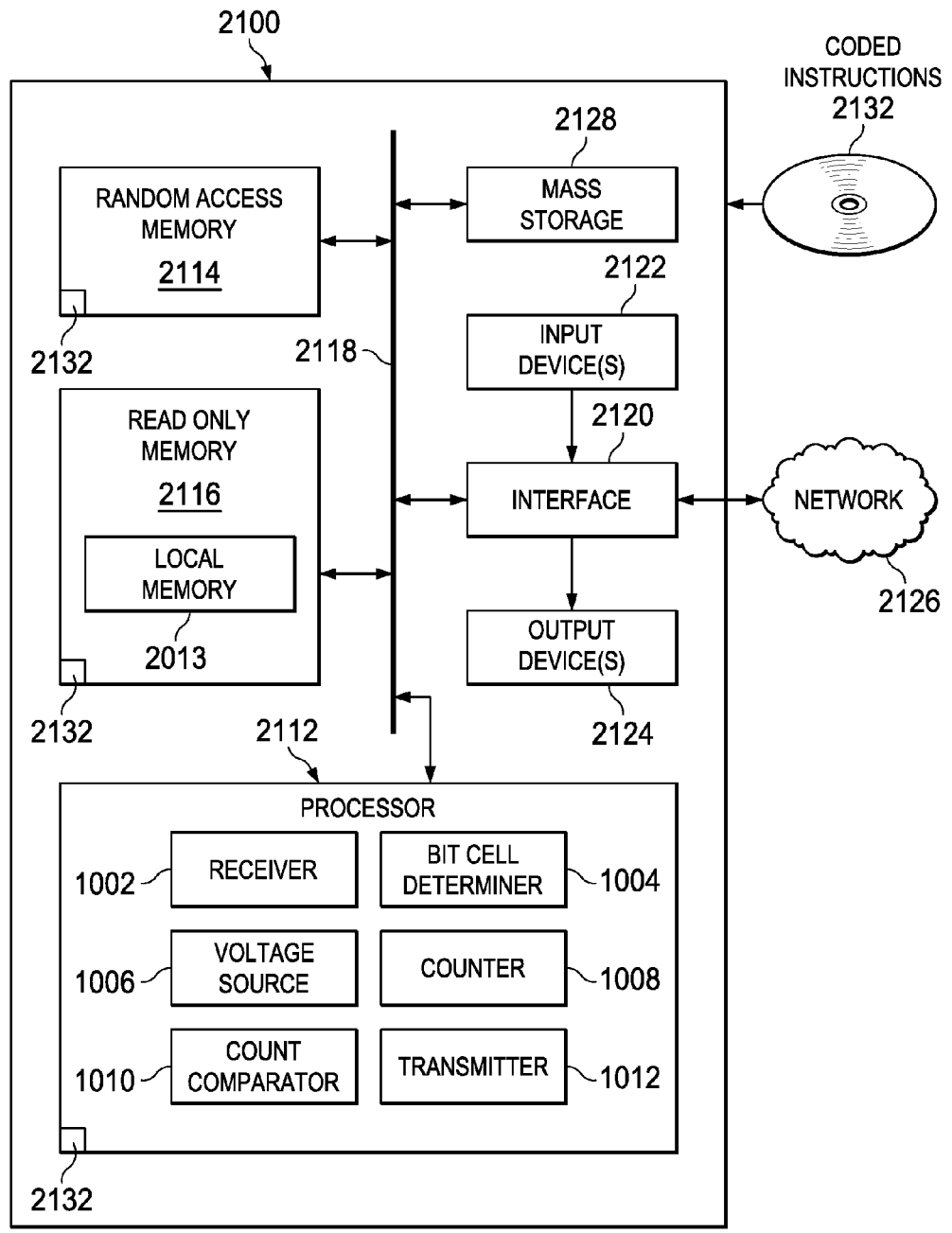
FIG. 21 is an alternative block diagram of a processor platform structured to execute the example machine readable instructions of FIGS. 15-18 to create a PUF and/or authenticate an IC.

FIG. 21 is a block diagram of an example processor platform 2100 capable of executing the instructions of FIGS. 15-18 to implement the example memory controller 202 of FIG. 1. The processor platform 2100 can be, for example, a server, a personal computer, a mobile device (e.g., a cell phone, a smart phone, a tablet such as an iPad™), a personal digital assistant (PDA), an Internet appliance, or any other type of computing device.

The processor platform 2100 of the illustrated example includes a processor 2112. The processor 2112 of the illustrated example is hardware. For example, the processor 2112 can be implemented by integrated circuits, logic circuits, microprocessors or controllers from any desired family or manufacturer.

The processor 2112 of the illustrated example includes a local memory 2113 (e.g., a cache). The example processor 2112 of FIG. 21 executes the instructions of FIGS. 15-18 to implement the example receiver 1002, the example bit cell determiner 1004, the example voltage source 1006, the example counter 1008, the example count comparator 1010, and the example count comparator 1010 of FIG. 10 to implement the example memory controller 202. The processor 2112 of the illustrated example is in communication with a main memory including a volatile memory 2114 and a non-volatile memory 2202 via a bus 2118. The volatile memory 2114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2202 may be implemented by flash memory and/or any other desired type of memory device. Access to the main memory 2114, 2202 is controlled by a memory controller.

The processor platform 2100 of the illustrated example also includes an interface circuit 2112. The interface circuit 2112 may be implemented by any type of interface standard, such as an Ethernet interface, a universal serial bus (USB), and/or a PCI express interface.

In the illustrated example, one or more input devices 2122 are connected to the interface circuit 2112. The input device(s) 2122 permit(s) a user to enter data and commands into the processor 2112. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 2124 are also connected to the interface circuit 2112 of the illustrated example. The output devices 2124 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 2112 of the illustrated example, thus, typically includes a graphics driver card, a graphics driver circuit or a graphics driver processor.

The interface circuit 2012 of the illustrated example also includes a communication device such as a transmitter, a receiver, a transceiver, a modem and/or network interface card to facilitate exchange of data with external machines (e.g., computing devices of any kind) via a network 2126 (e.g., an Ethernet connection, a digital subscriber line (DSL), a telephone line, coaxial cable, a cellular telephone system, etc.).

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, RAID systems, and digital versatile disk (DVD) drives.

The coded instructions 2132 of FIGS. 15-18 may be stored in the mass storage device 2128, in the volatile memory 2114, in the non-volatile memory 2202, and/or on a removable tangible computer readable storage medium such as a CD or DVD.

From the foregoing, it would be appreciated that the above disclosed methods, apparatus, and articles of manufacture create a PUF from an SRAM circuit. Using the examples disclosed herein, a PUF is generated using the response to challenges generated to measure the read access times of bit cells within the SRAM circuit. In some examples, read access times of bit cells are measured individually. In some examples, read access times of bit cells are measured and compared at the same time.

The traditional SRAM PUF is a weak PUF and has fewer available challenge response pairs. It is therefore easier for an attacker to determine all available challenge response pairs. Determining the challenge response pairs allows an attacker to clone an Integrated Circuit. A circuit with a strong PUF is a lot more difficult to clone since the number of possible challenge response pairs are increased significantly. Also, since the SRAM circuits are already found in most Integrated Circuits, there would not be a need to add significant additional circuitry to the existing Integrated Circuits.

From the foregoing, persons of ordinary skill in the art will appreciate that the above disclosed methods and apparatus may be realized within a single device or across two cooperating devices, and could be implemented by software, hardware, and/or firmware to implement the PUF disclosed herein.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
    a memory array comprising a first bit cell and a second bit cell;
    a voltage source to apply a voltage to the memory array;
    a timer to:
        after the voltage is applied to the memory array:
        determine a first duration between the applying of the voltage and a first output of the first bit cell of the memory array, the first output corresponding to a first value stored in the first bit cell; and
        determine a second duration between the applying of the voltage and a second output of the second bit cell of the memory array, the second output corresponding to a second value stored in the second bit cell; and
    a processor to determine a physically unclonable function based on a comparison of the first duration and the second duration, the physically unclonable function to establish an identification of a circuit that includes the memory array.

2. The apparatus of claim 1, wherein the processor is structured to generate an identifier based on the physically unclonable function, the identifier to identify the circuit.

3. The apparatus of claim 1, wherein the memory array is a random access memory array.

4. The apparatus of claim 3, wherein the random access memory array is a static random access memory (SRAM) array.

5. The apparatus of claim 1, wherein the voltage is a read voltage that initiates a read operation, the read voltage being on a wordline of the memory array.

6. The apparatus of claim 5, wherein the voltage source is structured to apply a supply voltage to the memory array and to decrease the supply voltage prior to applying the read voltage.

7. The apparatus of claim 1, wherein the timer is to determine a third duration between the applying of the voltage and a third output of a third bit cell, the third output corresponding to a third value stored in the third bit cell, the determining of the physically unclonable function being further based on a comparison of the first duration, the second duration, and the third duration.

8. The apparatus of claim 1, further including a transmitter to transmit the physically unclonable function to a database.

9. An apparatus comprising:
    a memory array comprising a bit cell;
    a voltage source to apply a voltage to the memory array;
    a bit cell determiner to:
        after applying a voltage to the memory array:
            measure, at a first time, a first output from the bit cell of the memory array; and
            measure, at a second time later than the first time, a second output from the bit cell; and
    a processor to determine a physically unclonable function based on a difference between the first output and the second output, the physically unclonable function to represent an identification of a circuit that includes the memory array.

10. The apparatus of claim 9, wherein the processor is structured to generate an identifier based on the physically unclonable function, the identifier to identify the circuit.

11. The apparatus of claim 9, wherein the memory array is a random access memory array.

12. The apparatus of claim 9, wherein the voltage is a read voltage, the read voltage initiates a read operation, and the read voltage is on a wordline of the memory array.

13. The apparatus of claim 12, wherein the voltage source is structured to apply a supply voltage to the memory array and is to decrease the supply voltage prior to applying the read voltage.

14. The apparatus of claim 9, wherein the bit cell determiner is structured to measure, at a third time later than the second time, a third output from the bit cell, the determining of the physically unclonable function being further based on a comparison of the first output, the second output, and the third output.

15. The apparatus of claim 9, wherein the bit cell determiner is structured to:
- measure, at the first time, a third output from a second bit cell; and
- measure, at the second time, a fifth output from the second bit cell, the determining of the physically unclonable function being further based on a comparison of the first output, the second output, the third output, the fourth output and the fifth output.

16. The apparatus of claim 9, further including a transmitter to transmit the physically unclonable function to a database.

17. The apparatus of claim 11, wherein the random access memory array is a static random access memory (SRAM) array.

* * * * *